(12) United States Patent  
Gupta et al.

(10) Patent No.: US 10,131,086 B2  
(45) Date of Patent: Nov. 20, 2018

(54) MICRO-STRUCTURE AND NANO-STRUCTURE REPLICATION METHODS AND ARTICLE OF MANUFACTURE

(75) Inventors: Mool C. Gupta, Yorktown, VA (US); Barada K. Nayak, Horseheads, NY (US); Paul O. Caffrey, Roanoke, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 0 days.

(21) Appl. No.: 13/536,695

(22) Filed: Jun. 28, 2012

(65) Prior Publication Data

US 2013/0189485 A1     Jul. 25, 2013

Related U.S. Application Data

(60) Provisional application No. 61/530,604, filed on Sep. 2, 2011, provisional application No. 61/503,433, filed on Jun. 30, 2011.

(51) Int. Cl.
     *B29C 59/02*      (2006.01)
     *B29D 11/00*      (2006.01)

(52) U.S. Cl.
     CPC ............ *B29C 59/02* (2013.01); *B29C 59/022* (2013.01); *B29D 11/00* (2013.01); *B29C 2059/023* (2013.01); *Y10T 428/24355* (2015.01)

(58) Field of Classification Search
     CPC .................................................... B29C 59/02

(Continued)

(56) References Cited

U.S. PATENT DOCUMENTS

| 4,622,095 A | 11/1986 | Grobman |
| 4,972,061 A | 11/1990 | Duley |

(Continued)

FOREIGN PATENT DOCUMENTS

| DE | 19731315 A1 | 1/1999 |
| WO | WO 2005/072437 | 8/2005 |

(Continued)

OTHER PUBLICATIONS

Pozzato et al. ("Superhydrophobic surfaces fabricated by nanoimprint lithography" Microelectronic Engineering 83, 884-888, 2006).*

(Continued)

*Primary Examiner* — Larry W Thrower  
(74) *Attorney, Agent, or Firm* — Robert J. Decker

(57) ABSTRACT

A method for the replication of a textured surface of a master is disclosed, in which the textured surface of the master is comprised of micron-scale cones having nano- or micro-scale surface features. Alternatively, the master may be comprised of micron-scale structures, nano-scale structures, and micron scale structures having nano-scale surface features. Replication can be achieved through a molding or embossing technique. Using these technique, the textured surface of the master is faithfully replicated onto the surface of the replica. A number of representative materials and additional processing steps are also disclosed. The replicated texture exhibits many useful properties, including enhanced hydrophobicity and reduced light reflection properties, making the disclosed method a simple and attractive alternative to existing texturing techniques.

6 Claims, 17 Drawing Sheets

(58) Field of Classification Search
USPC ............................................. 264/319
See application file for complete search history.

(56) References Cited

U.S. PATENT DOCUMENTS

| | | |
|---|---|---|
| 5,348,609 A | 9/1994 | Russell |
| 5,473,138 A | 12/1995 | Singh |
| 5,500,071 A | 3/1996 | Kaltenbach |
| 5,624,529 A | 4/1997 | Shul |
| 5,818,700 A | 10/1998 | Purinton |
| 6,169,014 B1 | 1/2001 | McCulloch |
| 6,238,847 B1 | 5/2001 | Axtell |
| 6,372,103 B1 | 4/2002 | Perry |
| 6,451,113 B1 | 9/2002 | Givargizov |
| 6,451,631 B1 | 9/2002 | Grigoropoluos |
| 6,489,188 B2 | 12/2002 | Jung |
| 6,504,180 B1 | 1/2003 | Heremans |
| 6,613,161 B2 | 9/2003 | Zheng |
| 6,635,932 B2 | 10/2003 | Grigoropoluos |
| 6,746,942 B2 | 6/2004 | Sato |
| 6,829,988 B2 | 12/2004 | George |
| 6,864,190 B2 | 3/2005 | Han |
| 6,893,886 B2 | 5/2005 | Liu |
| 6,919,162 B1 | 7/2005 | Brennen |
| 6,921,722 B2 | 7/2005 | Ogure |
| 6,948,843 B2 | 9/2005 | Laugharn |
| 7,057,256 B2 | 6/2006 | Carey |
| 7,114,448 B2 | 10/2006 | Salleo |
| 7,169,709 B2 | 1/2007 | Koide |
| 7,244,669 B2 | 7/2007 | Sirringhaus |
| 7,354,792 B2 | 4/2008 | Carey |
| 7,390,689 B2 | 6/2008 | Mazur |
| 7,442,629 B2 | 10/2008 | Mazur |
| 7,469,831 B2 | 12/2008 | Gu |
| 7,585,424 B2 | 9/2009 | Mei |
| 7,675,952 B2 | 3/2010 | Ushinsky |
| 7,750,353 B2 | 7/2010 | Lee |
| 7,754,508 B2 | 7/2010 | Lee |
| 7,884,446 B2 | 2/2011 | Mazur |
| 7,968,804 B2 | 6/2011 | Frey |
| 7,972,553 B2 | 7/2011 | Beck |
| 7,997,890 B2 | 8/2011 | Heidari |
| 8,143,686 B2 | 3/2012 | Mazur |
| 8,354,286 B2 | 1/2013 | Lee |
| 8,598,051 B2 | 12/2013 | Mazur |
| 2001/0030002 A1 | 10/2001 | Zheng |
| 2002/0014625 A1 | 2/2002 | Asami |
| 2002/0057487 A1 | 5/2002 | Hutcheson |
| 2003/0029495 A1 | 2/2003 | Mazur |
| 2004/0000540 A1 | 1/2004 | Soboyejo |
| 2004/0076813 A1 | 4/2004 | Han |
| 2004/0079730 A1 | 4/2004 | Ahrens |
| 2004/0227140 A1 | 11/2004 | Lee |
| 2005/0026401 A1 | 2/2005 | Shimomura |
| 2005/0170567 A1 | 8/2005 | Tanaka |
| 2005/0211680 A1 | 9/2005 | Li |
| 2006/0000814 A1 | 1/2006 | Gu |
| 2006/0079062 A1 | 4/2006 | Mazur |
| 2007/0020536 A1 | 1/2007 | Jung |
| 2007/0036951 A1 | 2/2007 | Nguyen |
| 2008/0011852 A1 | 1/2008 | Gu |
| 2008/0044943 A1 | 2/2008 | Mazur |
| 2008/0277826 A1 | 11/2008 | Chou |
| 2009/0321626 A1 | 12/2009 | Vertes |
| 2010/0002740 A1 | 1/2010 | Ushinsky |
| 2010/0143744 A1 | 6/2010 | Gupta |
| 2010/0219506 A1 | 9/2010 | Gupta |
| 2011/0033661 A1 | 2/2011 | Oawa |
| 2013/0020297 A1 | 1/2013 | Gupta |
| 2013/0025322 A1* | 1/2013 | Choi et al. ............ 65/102 |

FOREIGN PATENT DOCUMENTS

| | | |
|---|---|---|
| WO | WO 2008/091242 | 7/2008 |
| WO | WO 2008/127807 | 10/2008 |

OTHER PUBLICATIONS

Simpson ("Making the World's Most Superhydrophobic Surfaces") Oak Ridge National Laboratory, Aug. 13, 2010).*
Bassam et al., "Measurement of Optical and Electrical Properties of Silicon Microstructuring Induced by ArF Excimer Laser at SF6 Atmosphere," Applied Surface Science, 2008, pp. 2621-2628, vol. 254.
Bonse et. al., "Femtosecond Laser Ablation of Silicon-Modification Thresholds and Morphology" Applied Physics A, 2002, pp. 19-25, vol. 74.
Caffrey et al., "Ultrafast Laser-Induced Microstructure/Nanostructure Replication and Optical Properties," Applied Optics, Feb. 10, 2012, pp. 604-609, vol. 51, No. 5.
Campbell et al., "Light Trapping Properties of Pyramidally Textured," Journal of Applied Physics, Jul. 1, 1987, pp. 243-249, vol. 62, No. 1.
Carey, "Femtosecond-laser Microstructuring of Silicon for Novel Optoelectronic Devices," Thesis, The Division of Engineering and Applied Sciences, Harvard University, 2004, 162 pages.
Carey et al., "Visible and Near-Infrared Responsitivity of Femtosecond-Laser Microstructured Silicon Photodiodes," Optics Letters, Jul. 15, 2005, pp. 1773-1775, vol. 30, No. 14.
Chien et al., "Pulse Width Effect in Ultrafast Laser Processing of Materials," Applied Physics A: Materials Science & Processing, 2005, pp. 1257-1263, vol. 81, No. 6.
Crouch et al., "Comparision of Structure and Properties of Femtosecond and Nanosecond Laser-Structured Silicon," Applied Physics Letters, Mar. 15, 2004, pp. 1850-1852, vol. 84, No. 11.
Fauchet et al., "Surface Ripples on Silicon Gallium Arsenide Under Picosecond Laser Illumination," Applied Physics Letters, May 1, 1982, pp. 824-826, vol. 40, No. 9.
Gee et a., "Reflectance Control for Multicrystalline-Silicon Photovoltaic Modules using Textured-Dielectric Coatings," Photovoltaic Energy Conversion, Conference Record of the Twenty Fourth. IEEE Photovoltaic Specialists Conference—1994, IEEE First World Conference, 1994, pp. 1274-1277, vol. 2.
Gee et al., "The Effect of Encapsulation on the Reflectance of Photovoltaic Modules using Textured Multicrystalline-Silicon Solar Cells," Photovoltaic Energy Conversion, Conference Record of the Twenty Fourth. IEEE Photovoltaic Specialists Conference—1994, IEEE First World Conference, 1994, pp. 1555-1558, vol. 2.
Gupta, "A Study of Laser Marking of Thin Films," Journal of Material Research, 1988, pp. 1187-1195, vol. 3, No. 6.
Gupta et al., "Diode Pumped Solid State Lasers for Surface Microtexture," Journal of Laser Micro/Nanoengineering, 2013, pp. 124-130, vol. 8, No. 2.
Henley et al., "Dynamics of Confined Plumes During Short and Ultrashort Pulsed Laser Ablation of Graphite," Physical Review B, 2005, pp. 205413-1-205413-13, vol. 72.
Her et al., "Microstructuring of Silicon with Femtosecond Laser Pulses," Appl. Phys. Lett., Sep. 21, 1998, pp. 1673-1675, vol. 73, No. 12.
Her et al., "Femtosecond Laser-Induced Formation of Spikes on Silicon," Applied Physics A, 2000, pp. 383-385, vol. 70.
Hermann, "Impact of Surface Topography and Laser Pulse Duration for Laser Ablation Of Solar Cell Front Side Passivating SiNx Layers," Journal of Applied Physics, 2010, pp. 114514-1-114514-8, vol. 108.
Iyengar et al., "Laser Assisted Doping for Photovoltaic Applications," Journal of Laser Micro Nanoengineering, 2009, pp. 89-94, vol. 4, No. 2.
Iyengar et al., "Optical Properties of Silicon Light Trapping Structures for Photovoltaics," Solar Energy Materials and Solar Cells, 2010, pp. 2251-2257, vol. 94.
Iyengar et al., "Ultra Low Reflectance Metal Surfaces by Ultrafast Laser Texturing," Applied Optics, Nov. 1, 2010, pp. 5983-5988, vol. 49, No. 31.
Iyengar et al., "Properties of Ultrafast Laser Textured Silicon for Photovoltaics," Solar Energy Materials & Solar Cells, 2011, pp. 2745-2751, vol. 95.
Kabashin et al., "Nanofabrication with Pulsed Lasers," Nanoscale Research Letters, 2010, pp. 454-463, vol. 5.

(56) References Cited

OTHER PUBLICATIONS

Khung et al., "Micropatterning of Porous Silicon Films by Direct Laser Writing," Biotechnology Progress, 2006, pp. 1388-1393, vol. 22, No. 5.
Kovalchenko et al., "The Effect of Laser Texturing of Steel Surfaces and Speed-Load Parameters on the Transition of Lubrication Regime from Boundary to Hydrodynamic," Tribology Transactions 2004, pp. 299-307, vol. 47.
Li et al., "Laser-Textured Silicon Photodiode with Broadband Spectral Response," Applied Optics, Jun. 10, 2011, pp. 2508-2511, vol. 50, No. 17.
Liu et al., "Phase Transformation on and Charged Particle Emission from a Silicon Crystal Surface, Induced by Picosecond Laser Pulses," Applied Physics Letters, Nov. 1, 1981, pp. 755-757, vol. 39, No. 9.
Lowndes et al., "Early Stages of Pulsed-Laser Growth of Silicon Microcolumns and Microcones in Air and SF6," Applied Surface Science, 2000, pp. 647-658, vol. 154-155.
MacDonald et al., "Texturing Industrial Multicrystalline Silicon Solar Cells," Solar Energy, 2004, pp. 277-283, vol. 76, Issues 1-3.
Makower et al., "Clean Energy Trends 2005," Clean Edge, Mar. 2005, pp. 1-18.
Martin et al., "Measuring Liquid Properties with Smooth- and Textured-Surface Resonators," Frequency Control Symposium, 47th, Proceedings of the 1993 IEEE International, 1993, pp. 603-608.
Martinu et al., "Plasma Deposition of Optical Films and Coatings: A Review," Journal of Vacuum Science & Technology A, 2000, pp. 2619-2645, vol. 18, No. 6.
Mata et al., "Osteoblast Attachment to a Textured Surface in the Absence of Exogenous Adhesion Proteins," IEEE transactions on NanoBioscience, 2003, pp. 287-294, vol. 2, No. 4.
Matsui et al., "Influence of Substrate Texture on Microstructure and Photovoltaic Performances of Thin Film Polycrystalline Silicon Solar Cells," Journal of Non-Crystalline Solids, 2002, pp. 1152-1156, vol. 299-302, Part 2.
Mills et al., "Solidification Driven Extrusion of Spikes During Laser Melting of Silicon Pillars," Nanotechnology, 2006, pp. 2471-2744, vol. 17.
Mills et al., "Laser-Etched Silicon Pillars and Their Porosification," Journal of Vacuum Science & Technology A, 2004, pp. 1647-1651, vol. 22, No. 4.
Nayak et al., "Femtosecond Laser-Induced Micro-Structure of Thin a-Si:H Films," MRS Fall 2004 meeting, Nov. 29-Dec. 3, 2004, 14 pages, Boston, MA.
Nayak et al., "Femtosecond Laser-Induced Micro-Structure of Thin a-Si:H Films," Materials Research Society Symposium Proc. 850, 2005, 5 pages, Warrendale, PA.
Nayak et al., "Semiconductor Laser Crystallization of a-Si:H on Conducting Tin Oxide Coated Glass for Solar Cell and Display Applications," Applied Physics A, Feb. 2005, pp. 1077-1080, vol. 80, No. 5.
Nayak et al., "Femtosecond-Laser-Induced-Crystallization and Simultaneous Formation of Light Trapping Microstructures in Thin a-Si:H Films," Applied Physics A: Materials Science and Processing, 2007, pp. 663-666, vol. 89, No. 3.
Nayak et al., "Spontaneous Formation of Nanospiked Microstructures in Germanium by Femtosecond Laser Irradation," Nanotechnology 2007, 195302 (4pp), vol. 18.
Nayak et al., "Ultrafast-Laser-Assisted Chemical Restructuring of Silicon and Germanium Surfaces," Applied Surface Science, 2007, pp. 6580-6583, vol. 253, No. 15.
Nayak et al., "Formation of Nano-Textured Conical Microstructures in Titanium Metal Surface by Femtosecond Laser Irradiation," Applied Physics A, 2008, pp. 399-402, vol. 90.
Nayak et al., "Self-Organized Micro/Nano Structures in Metal Surfaces by Ultrafast Laser Irradiation," Optics and Lasers in Engineering, 2010, pp. 940-949, vol. 48.
Nayak et al., "Ultrafast Laser-Induced Self-Organized Conical Micro/Nano Surface Structures and their Origin," Optics and Lasers in Engineering, 2010, pp. 966-973, vol. 48.
Nayak et al., "Efficient Light Trapping in Silicon Solar Cells by Ultrafast-Laser-Induced Self-Assembled Micro/Nano Structures," Progress in Photovoltaics: Research and Applications, 2011, pp. 631-639, vol. 19.
Nayak et al., "Micro Texturing of Silicon Using Pulsed N2-laser and Formation Mechanism," Applied Optics, Jan. 1, 2012, pp. 114-120, vol. 51, No. 1.
Sparber et al., "Comparison of Texturing Methods for Monocrystalline Silicon Solar Cells using KOH and Na2C03," Proceedings of 3rd World Conference on Photovoltaic Energy Conversion, 2003, pp. 1372-1375, Osaka, Japan.
Tucci et al., "CF4/O2 Dry Etching of Textured Crystalline Silicon Surface in a-Si:H/c-Si Heterojunction for Photovoltaic Applications," Solar Energy Materials & Solar Cells, 2001, pp. 175-185, vol. 69, No. 2.
Vinod et al., "Surface and Optical Characterization of the Porous Silicon Textured Surface," Journal of Materials Science: Materials in Electronics, 2005, pp. 1-6, vol. 16, No. 1.
Yamada et al., "Optimization of Anti-Reflection Moth-Eye Structures for use in Crystalline Silicon Solar Cells," Progress In Photovoltaics: Research and Applications, 2011, pp. 134-140, vol. 19, No. 2.
Photovoltaics, Sun & Wind Energy 2, 2005, pp. 80-84.
Raksi et. al.. "Ultrafast X-Ray Absorption Probing of a Chemical Reaction," The Journal of Chemical Physics, Apr. 15, 1996, pp. 6066-6069, vol. 104, No. 15.
Redfield, "Multiple-Pass Thin-Film Silicon Solar Cell," Applied Physics Letters, Dec. 1, 1974, pp. 647-648, vol. 25, No. 11.
Riedel et al., "Fabrication of Ordered Arrays of Silicon Cones by Optical Diffraction in Ultrafast Laser Etching with SF6," Applied Physics A, 2004, pp. 381-386, vol. 78.
Seia, US Solar Industry Year in Solar, US Solar Energy Industry Charging Ahead, Prometheus Institute, 2006, pp. 1-8.
Shank et al., "Femtosecond-Time-Resolved Surface Structural Dynamics of Optically Excited Silicon," Physical Review Letters, Sep. 5, 1983, pp. 900-902, vol. 51, No. 10.
Sheehy et al., "Role of the Background Gas in the Morphology and Optical Properties of Laser-Microstructured Silicon," Chemistry of Materials, 2005, pp. 3582-3586, vol. 17.
Shen et al., "Porous Silicon as a Versatile Platform for LaserDesorption/Ionization Mass Spectrometry," Analytical Chemistry, Feb. 1, 2001, pp. 612-619, vol. 73, No. 3.
Shen et al., "Formation of Regular Arrays of Silicon Microspikes by Ferntosecond Laser Irradiation through a Mask," Applied Physics Letters, 2003, pp. 1715-1717, vol. 82, No. 11.
SiOnyx, "Laser Texturing Yields Solar Efficiency Boost," Optics.org, News & Analysis, Oct. 26, 2011, 12 pages, http://optics.org/news/2/10/24.
Papet et al., "Pyramidal Texturing of Silicon Solar Cell with TMAH chemical Anisotropic Etching," Solar Energy Materials 8, Solar Cells, 2006, pp. 2319-2328, vol. 90, No. 15.
Pedraza et al., "Silicon Microcolumn Arrays Grown by Nanosecond Pulsed-Excimer Laser Irradiation," Applied Physics Letters, Apr. 19, 1999, pp. 2322-2324, vol. 74, No. 16.
Pedraza et al.; "Self-Organized Silicon Microcolumn Arrays Generated by Pulsed Laser Irradiation," Applied Physics A, 1999, pp. 5731-S734, vol. 69 [Suppl.].
Pedraza et al., "Surface Micro-Structuring of Silicon by Excimer-Laser Irradiation in Reactive Atmospheres," Applied Surface Science, 2000, pp. 251-257, vol. 168.
Vorobyev et al., "Femtosecond Laser Nanostructuring of Metals," Optics Express, Mar. 2006, pp. 2164-2169, vol. 14, No. 6.
Wu et al., "Near-Unity Below-Band-Gap Absorption by Microstructured Silicon," Applied Physics Letters, Mar. 26, 2001, pp. 1850-1852, vol. 78, No. 13.
Xia et al., "Unconventional Methods for Fabricating and Patterning Nanostructures," Chemical Reviews, 1999, pp. 1823-1848, vol. 99, No. 7.
Yoo et al., "Black Surface Structures for Crystalline Silicon Solar Cells," Materials Science and Engineering B, 2009, pp. 333-337, vol. 159-160.
Young et al., "Laser-Induced Periodic Surface Structure," Physical Review B, Jan. 15, 1983, pp. 1155-1172, vol. 27, No. 2.

(56) References Cited

OTHER PUBLICATIONS

Zhao et al. "22.7% Efficient Silicon Photovoltaic Modules with Textured Front Surface," IEEE Transactions on Electron Devices, 1999, pp. 1495-1497, vol. 46, No. 7.

Zhao et al., "Picosecond Pulse Laser Microstructuring of Silicon," Chinese Physics Letters, 2003, pp. 1789-1791, vol. 20, No. 10.

Zhigilei, "Dynamics of the Plume Formation and Parameters of the Ejected Clusters in Short-Pulse Laser Ablation," Applied Physics A, 2003, pp. 339-350, vol. 76.

Zorba et al., "Laser Microstructuring of Si Surfaces for Low-Threshold Field-Electron Emission," Thin Solid Films, 2004, pp. 492-495, vol. 453-454.

\* cited by examiner

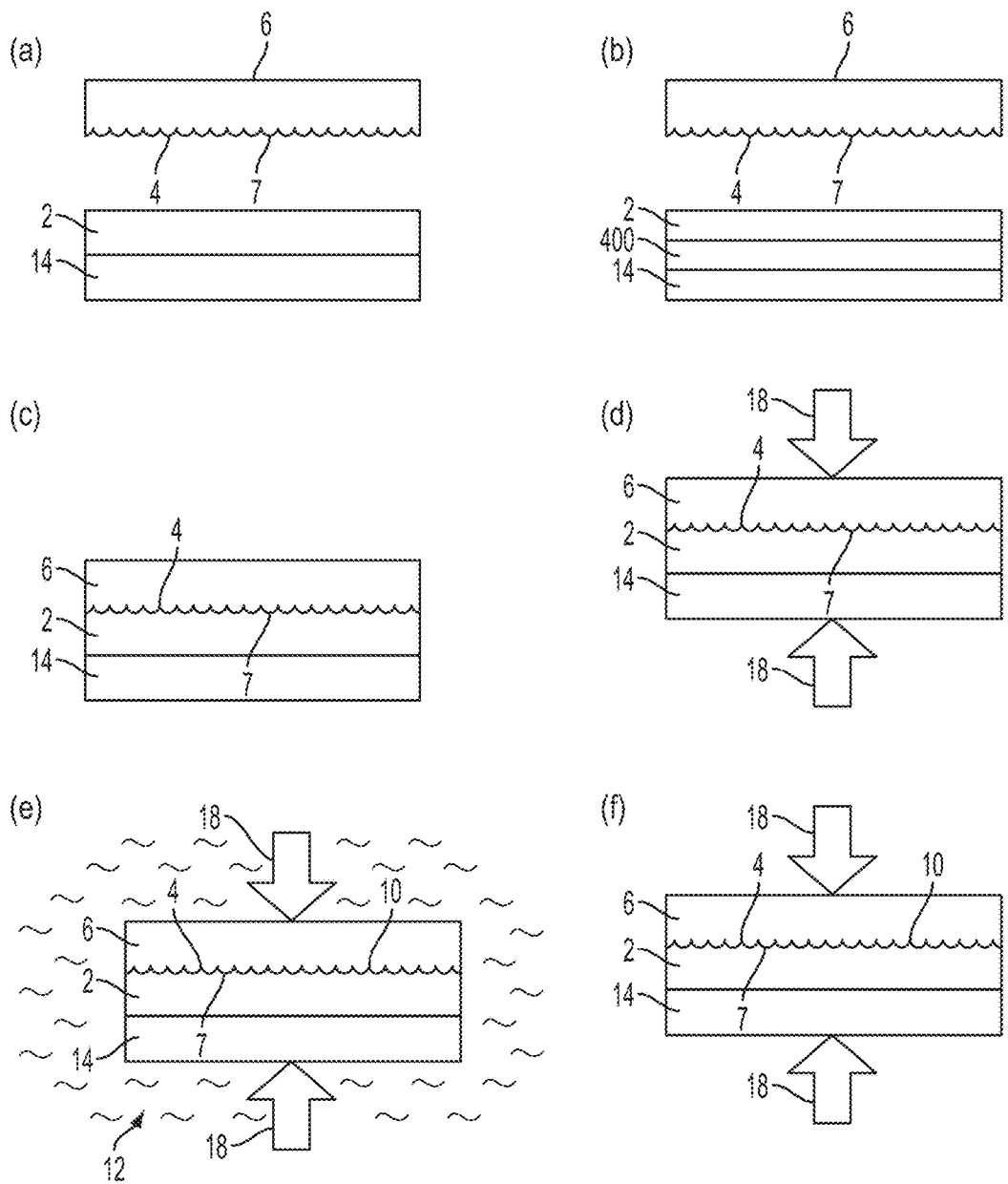
FIG. 13 A - F

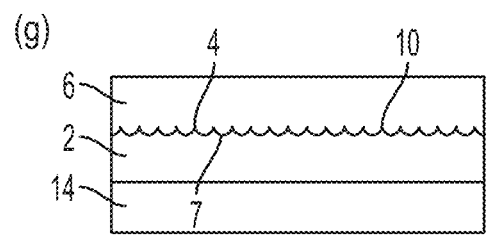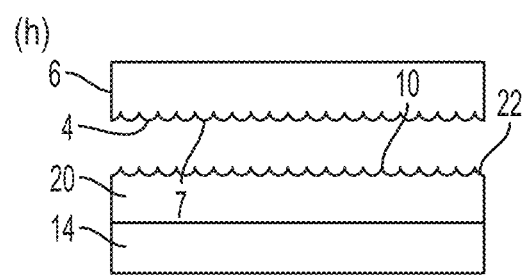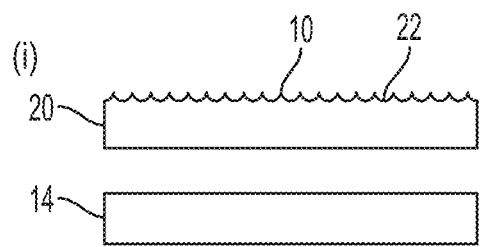
FIG. 13 G - I

MICRO-STRUCTURE AND NANO-STRUCTURE REPLICATION METHODS AND ARTICLE OF MANUFACTURE

RELATED APPLICATIONS

The present application claims priority from U.S. Provisional Application Ser. No. 61/503,433 filed Jun. 30, 2011, entitled "Ultrafast Laser Induced Micro/nano Structures Replication and Optical Properties and Related Method" and U.S. Provisional Application Ser. No. 61/530,604 filed Sep. 2, 2011, entitled "Ultrafast Laser Induced Micro/nano Structures Replication and Optical Properties and Related Method;" the disclosure of which are hereby incorporated by reference herein in their entirety.

This application is related to U.S. application Ser. No. 12/530,313, filed on Feb. 23, 2010, which is a national stage filing of International Application No. PCT/US2008/056033, filed Mar. 6, 2008; the full disclosures of these applications are incorporated herein by reference in their entirety.

This application is related to U.S. application Ser. No. 12/158,553, filed on Jun. 20, 2008, which is a national stage filing of International Application Serial No. PCT/US2006/049065, filed Dec. 21, 2006; the full disclosures of these applications are incorporated herein by reference in their entirety.

FIELD OF THE INVENTION

The present invention relates generally to the field of micro-structure and nano-structure replication to be used for providing textured materials for a variety of applications.

BACKGROUND OF INVENTION

There are many potential applications for surfaces with texture at the micro/nano scale. These applications include the electronics industry where surface texture can be applied to novel sensors and devices, the solar energy industry where surface texture plays an important role in adding to the efficiency of the solar cell, and the medical industry where textured surfaces play many important roles by providing hydrophobic and hydrophilic surfaces where cell growth can be controlled.

Lately surface texture has become a subject of much interest due to the phenomenal growth in the photovoltaic solar industry and by the drive for more efficient solar cells. Surface texture has also been demonstrated to increase the efficiency of the solar cell module. The addition of an anti-reflective surface (ARC) layer is typically deployed in addition to surface texture but even with these measures, reflection losses typically amount to 5-10 percent. Although there are other methods of inducing surface texture, surface texture is typically applied by use of a chemical isotropic or anisotropic etching process. This processing step is not only costly and time consuming, but also is ineffective for technologies other than mono-crystalline silicon. There is a need for a flexible, cost-effective approach to providing materials with the ability to reduce surface reflection of solar light that causes lower conversion efficiency.

There is also much interest in surface texture technologies for anti-icing applications in, for example, commercial and military airplanes, blades for wind energy generation, large refrigeration systems used in biomedical applications and many other industries. In the United States aviation industry alone, it has been estimated that over 25 million gallons of anti-icing chemicals are used annually at a purchase cost of $8-$12 per gallon, which does not include any costs related to environmental impact.

Boeing recently published a list of current alternatives being tested to reduce dependence on de-icing fluid, including special hangars with infrared heaters, truck-mounted infrared heater panels, forced hot-air systems, combination hot-air systems and de-icing fluids, and laser-based systems. There is a need for alternative, lower-cost methods. Ice formation is also a significant problem for wind energy generation as ice adds weight to blades that causes lower conversion efficiency as well as safety issues from flying ice debris. Wind power operators currently either accept the diminished efficiency of ice forming on their blades or they install shut off mechanisms to prevent the blades from rotating. Similarly, other industries which use large scale freezers must take steps to be certain that ice is removed on pipes and other structures. There is a need to develop a low-priced solution that would eliminate many of these problems associated with ice formation.

Recently work has been done producing anti-reflecting coatings by utilizing nanoimprint replication techniques to produce textured "moth-eye" surfaces. Whereas this method is simpler than the more traditional chemical etching techniques, there is need for an even simpler and cost-effective solution. A simple, cost-effective solution for surface texturing would allow for wider adoption of these technologies in various industries, and contribute to reduction in costs, enhanced efficiency from time savings, and the added benefit of enhanced safety in many applications.

SUMMARY OF EXEMPLARY EMBODIMENTS OF THE INVENTION

New methods of producing textured surfaces using ultrafast laser radiation have been successfully developed that can produce micro/nano textures surfaces on metals and semiconductors. An embodiment of the present invention demonstrates the replication and use of these textures using methods that are simple and are readily applicable to industrial processes. An aspect of an embodiment provides, among other things, a novel approach to the replication of ultrafast laser-induced micro/nano surface textures on to polydimethylsiloxane (PDMS). This new surface texture replication process reduces the processing steps for texturing while improving light trapping. The surface texture layer could also serve as the required protective layer eliminating additional processing steps for photovoltaic application. An aspect of an embodiment of the present invention employs a mold method for replication. Another aspect of an embodiment of the present invention employs an embossing method for replication.

This surface texture replication demonstrates a novel approach that serves at least two purposes. Surface texture replication reduces the processing step for texturing while improving physical and chemical properties. These properties may include improved light trapping capabilities, increased hydrophobicity, or other optical, electrical, chemical or physical properties. Two major applications of the low cost replicated micro/nano textured surfaces are, for example but not limited thereto, anti-ice formation or enhanced solar light absorption. The surface texture layer may also serve as a protective layer eliminating additional processing steps. While the fabrication of laser generated micro/nano texture process for large area applications will be relatively slow and hence more expensive, the method of replication to polymeric surfaces allows for large area fabrication at relatively low cost. Also, an aspect of an embodiment of the described invention reduces surface reflection over a broad angle of light incidence and solar spectral range, and has the potential to compete favorably against the currently used method of anti-reflection layer deposited by vacuum coating process.

Some of the advantages of various aspects of the present invention may include providing a simpler single-step process, providing a process having a reduction in steps, reducing costs in processing and fabrication, enhancing efficiency of various technologies, and enhancing efficiency from time savings and enhanced safety.

An aspect of an embodiment provides, among other things, a method for the replication of a textured surface of a master whereby the textured surface of the master is comprised of micron-scale cones having nano- or micro-scale surface features. Moreover, an aspect of an embodiment provides, among other things, a method for the replication of a textured surface of a master whereby the textured surface of the master is comprised of micron-scale structures, nano-scale structures, and micron scale structures having nano-scale surface features. Replication can be achieved through a molding or embossing technique. Using these techniques, the textured surface of the master is faithfully replicated onto the surface of the replica. A number of representative materials and additional processing steps are also disclosed. The replicated texture exhibits many useful properties, including enhanced hydrophobicity and reduced light reflection properties, making the disclosed method (and resultant structure) a simple and attractive alternative to existing texturing techniques.

An aspect of an embodiment of the present invention provides, among other things, a method for replicating at least one master having at least one textured surface, wherein the at least one textured surface is textured with microtexture cones. The method may comprise: providing at least one replicating material; placing the at least one replicating material in conforming contact with the at least one textured surface; heating the at least one replicating material for at least a portion of the time that the at least one replicating material is in contact with the at least one textured surface of the at least one master; and removing the at least one replicating material from the at least one textured surface to provide a replica of the microtextured surface of the at least one master, wherein the replica comprises a surface with microstructure cones.

An aspect of an embodiment of the present invention provides, among other things, a method for replicating at least one master having at least one textured surface, wherein the at least one textured surface is textured with microtexture cones. The method may comprise: providing at least one replicating material; placing the at least one replicating material in conforming contact with the at least one textured surface; heating the at least one replicating material; removing the at least one replicating material from the at least one textured surface to provide a replica of the microtextured surface of the at least one master, wherein the replica comprises a surface with microstructure cones.

An aspect of an embodiment of the present invention provides, among other things, a method for replicating at least one master having at least one textured surface, wherein the at least one textured surface is textured with microtexture cones. The method may comprise the following steps: providing at least one substrate; providing at least one replicating material, wherein the at least one replicating material is in communication with the at least one substrate; placing the at least one textured surface of the at least one master in contact with the at least one replicating material; applying an embossing force to the combination of the at least one master, the at least one replicating material, and the at least one substrate; heating at least one of the at least one master, the at least one replicating material, and the at least one substrate; reducing or eliminating the heating; removing the embossing force; and separating the at least one master from the at least one replicating material to directly provide a replica of the microtextured surface of the at least one master, without any additional processing steps to accomplish the replica, and wherein the replica comprises a surface with microtexture cones.

An aspect of an embodiment of the present invention provides, among other things, a method for replicating at least one master having at least one textured surface, wherein the at least one textured surface is textured with microtexture features. The method may comprise: providing at least one replicating material; placing the at least one replicating material in conforming contact with the at least one textured surface; heating the at least one replicating material for at least a portion of the time that the at least one replicating material is in contact with the at least one textured surface of the at least one master; and removing the at least one replicating material from the at least one textured surface to provide a replica of the microtextured surface of the at least one master, wherein the replica comprises a surface with microstructure features.

An aspect of an embodiment of the present invention provides, among other things, a method for replicating at least one master having at least one textured surface, wherein the at least one textured surface is textured with microtexture features. The method may comprise the following steps: providing at least one substrate; providing at least one replicating material, wherein the at least one replicating material is in communication with the at least one substrate; placing the at least one textured surface of the at least one master in contact with the at least one replicating material; applying an embossing force to the combination of the at least one master, the at least one replicating material, and the at least one substrate; heating at least one of the at least one master, the at least one replicating material, and the at least one substrate; reducing or eliminating the heating; removing the embossing force; and separating the at least one master from the at least one replicating material to directly provide a replica of the microtextured surface of the at least one master, without any additional processing steps to accomplish the replica, and wherein the replica comprises a surface with microtexture features.

An aspect of an embodiment of the present invention provides, among other things, a replica of the microtextured surface of the at least one master produced by any one of the methods, techniques or approaches disclosed herein.

These and other objects, along with advantages and features of various aspects of embodiments of the invention disclosed herein, will be made more apparent from the description, drawings and claims that follow.

BRIEF DESCRIPTION OF THE DRAWINGS

The foregoing and other objects, features and advantages of the present invention, as well as the invention itself, will be more fully understood from the following description of preferred embodiments, when read together with the accompanying drawings.

1(A) shows a depiction of the mold method as carried out in Experiment 1. FIG. 1(B) shows an exploded view of the components as they were combined in Experiment 2. FIG. 1(C) depicts the replicating material in contact with the master.

FIGS. 2 (A) and (B) show SEM images of Ti and Si surfaces of the master, respectively, that were irradiated with an ultrafast laser source. FIGS. 2(C) and (D) show the replicated PDMS surface for the respective Ti and Si textured surfaces as masters. These results were demonstrated by producing a mold of the textured master as detailed in the experimental section and shown in FIG. 1(A). FIGS. 2(E) and 2(F) show the detail visible from the SEM images of the replicas and the insets (FIGS. 2(G)-(H)) of the Ti and Si molds, respectively. The SEM images clearly show detail replication at the nano-scale.

FIGS. 6(A) and 6(B) show the results when the textured side of the experimental PDMS replica is directed toward the illumination. The forward scattering field (FIG. 6(A)) shows a well developed scattered field with no transmitted laser dot visible whereas the backward scattered field (FIG. 6(B)) shows very little illumination. FIGS. 6(C) and 6(D) show the results when the non-textured side of the experimental PDMS replica is directed toward the illumination. The results for the forward scattered field and the backward scattered fields are shown in FIG. 6(C) and FIG. 6(D) respectively.

Figure 6:
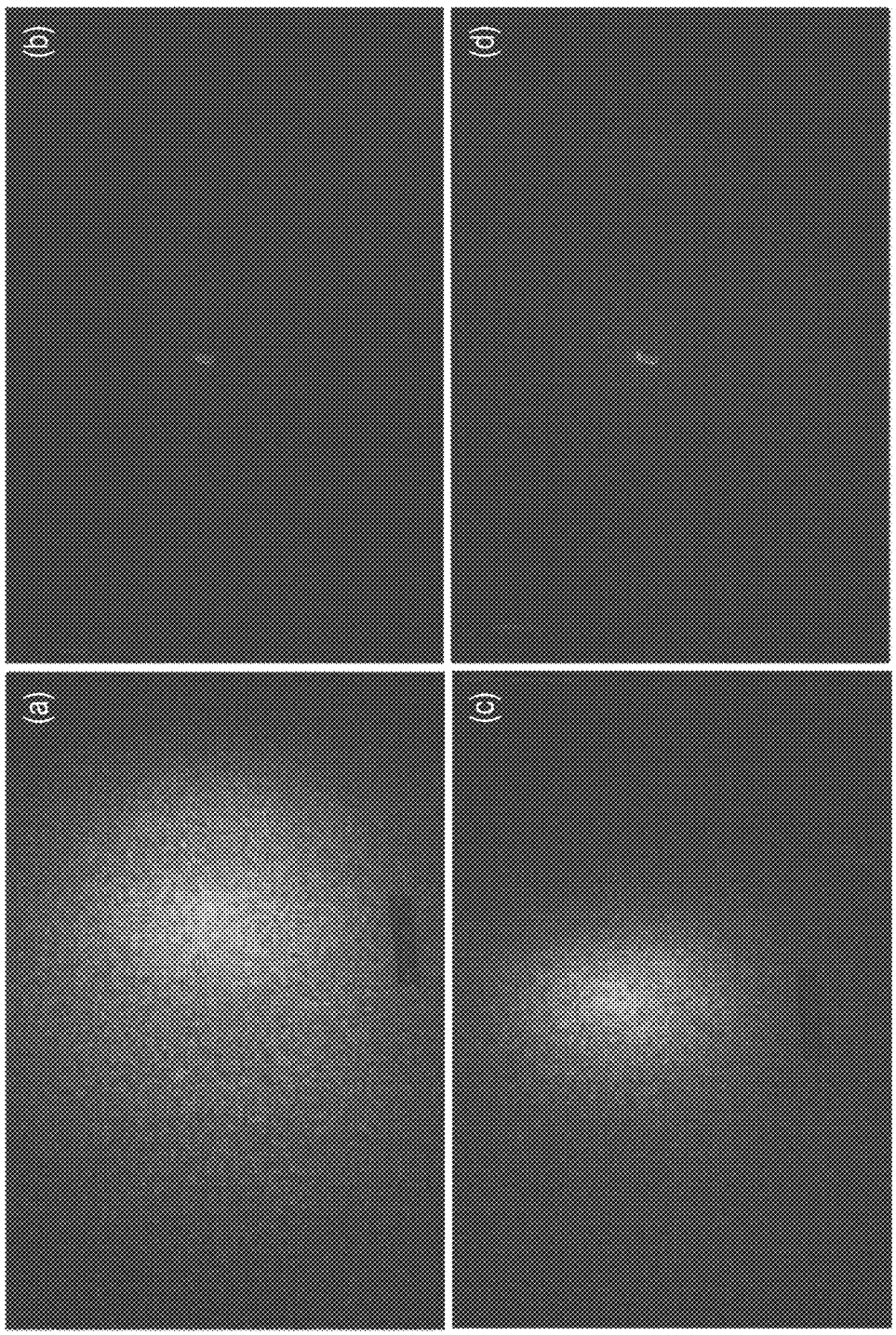
FIG. 6 shows the results of the optical analysis performed on the experimental PDMS replicas.
Figure 7:
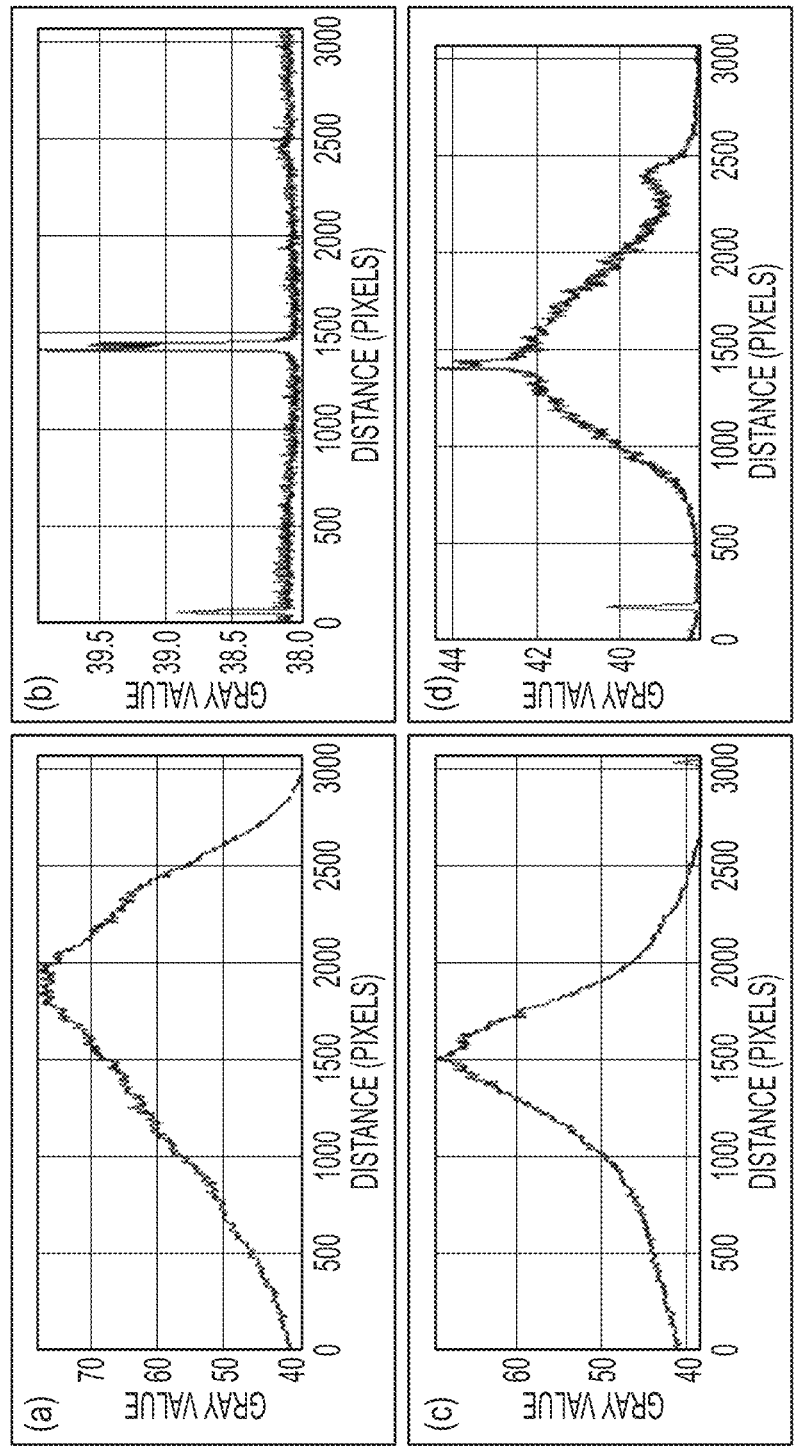
FIG. 7 shows histograms created from the images shown in FIG. 6 using image processing software (ImageJ) using the software's plot profile feature that allows the image to be broken down into vertical sections where the total integrated flux for each line is plotted as a histogram. This analysis shows the minimal backward scattered field of FIG. 7(B) of the textured side when compared with the forward scattered field of FIG. 7(A). Examining the backward scattering histogram FIG. 7(B), all that is visible is the central spike with no Gaussian scattering pattern.

Similar photographic analysis was performed with the non-textured side of the PDMS film towards the illumination by processing the images shown in FIGS. 6(C) and 6(D), which shows the minimal backward scattered field of FIG. 7(D) of the textured side when compared with the forward scattered field of FIG. 7(C).

Figure 8:
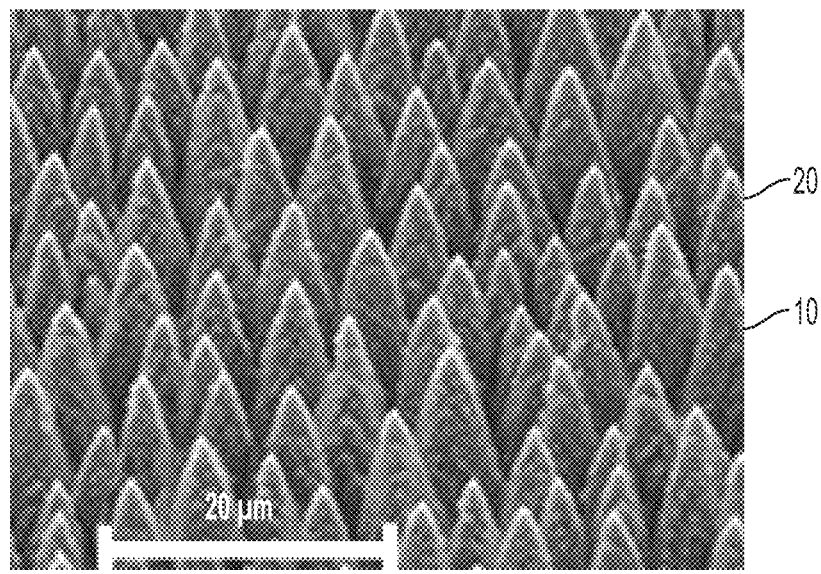

FIG. 8 provides an SEM image of the textured cones of a PDMS replica produced in experiments.

Figure 9:
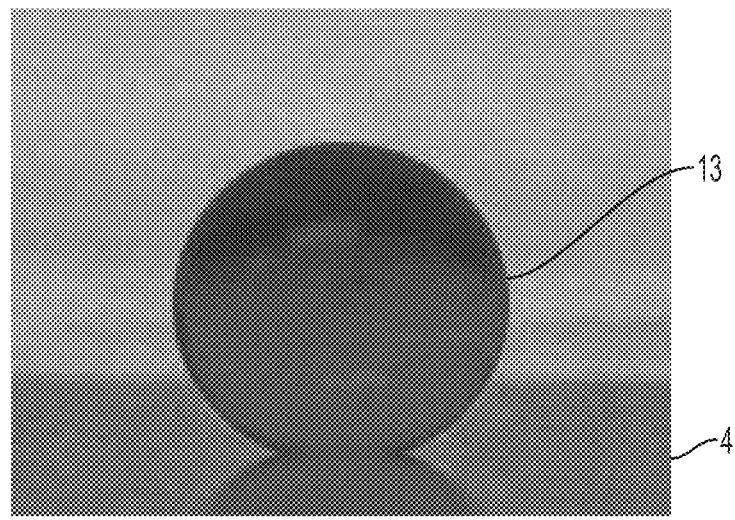

FIG. 9 provides a microscopy image illustrating the wetting properties of the textured surface using a water droplet on a microtexture cone-textured surface (as provided by an embodiment of the present invention).

Figure 10:
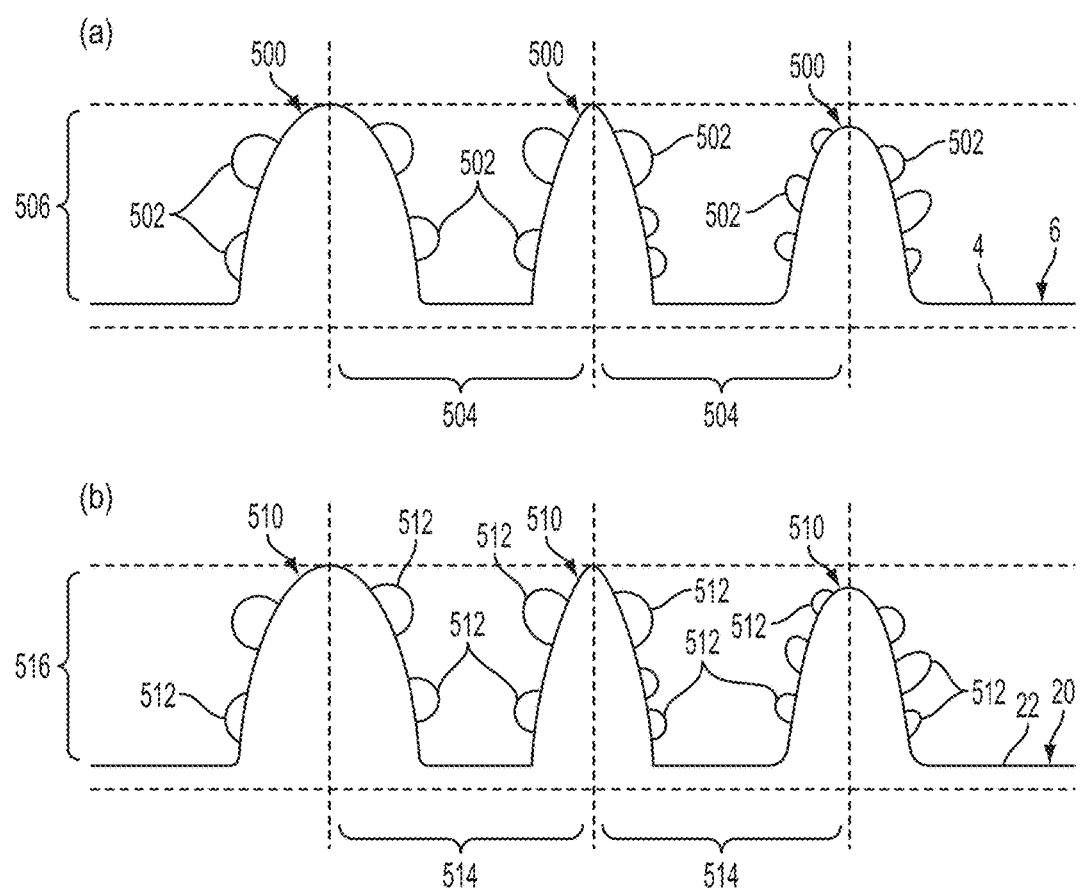

FIG. 10 is a schematic section view of a graphical representation of the microtexture cones with nanoscale features. FIGS. 10(A) and 10(B) are such representations for the textured surface of a master and a replica, respectively.

Figure 11:
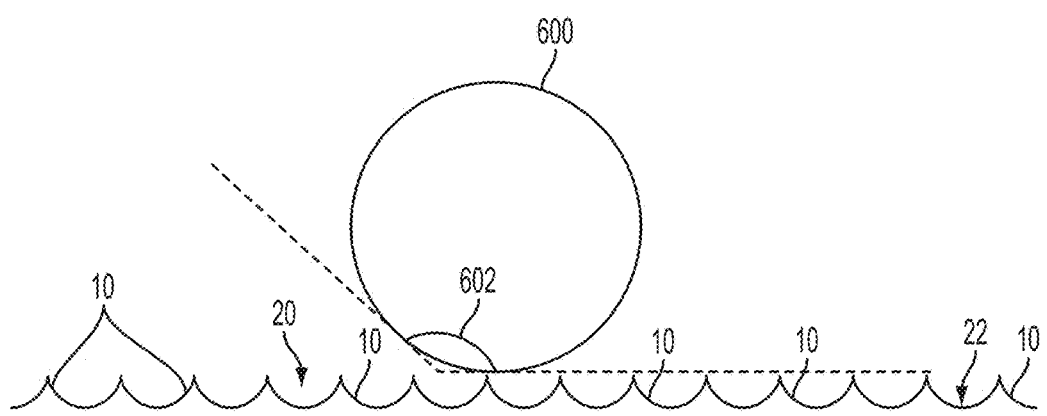

FIG. 11 is a schematic section view of a water droplet on surface textured with the microtextured cones (as provided by an embodiment of the present invention) and the associated wetting angle.

Figure 12:
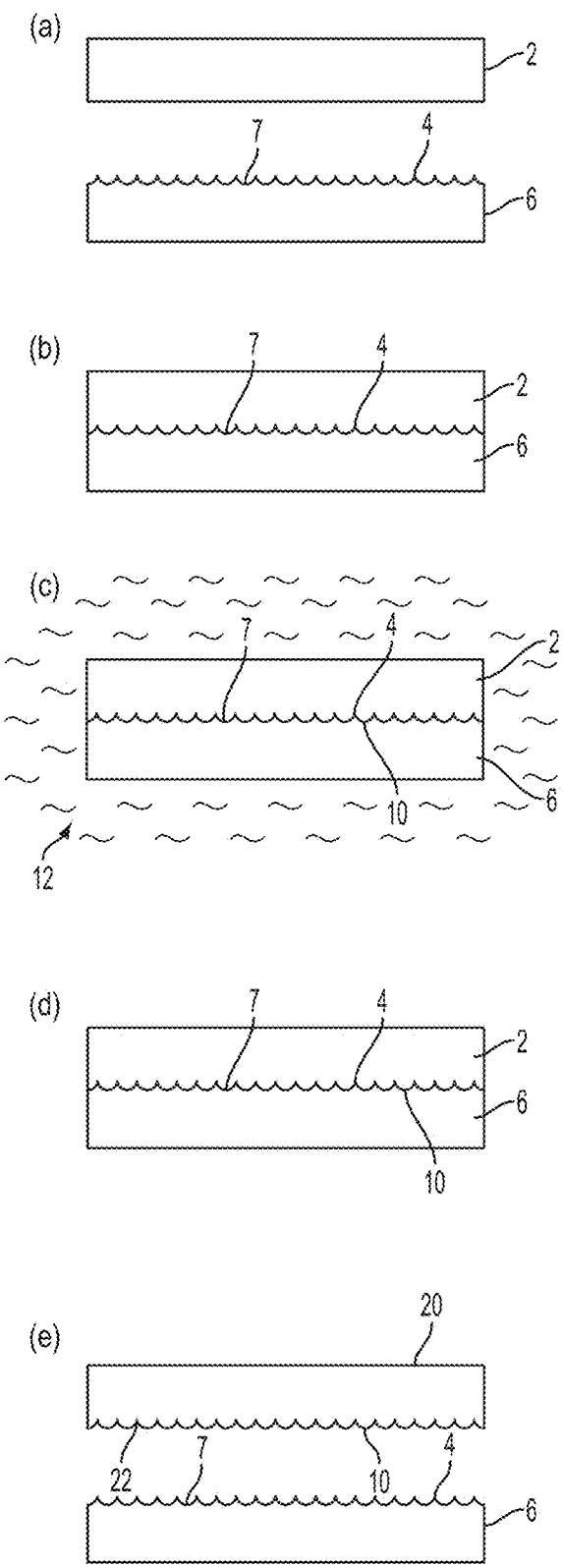

FIG. 12 is a longitudinal section view of one embodiment of the present invention's molding method. FIG. 12(A) shows the master with textured surface and the replicating material prior to coating contacting the master with the replicating material. FIG. 12(B) shows the textured master and replicating material after coating or contacting has taken place. FIG. 12(C) shows heat applied while molding the replicating material. FIG. 12(D) shows the master and replicating material after being heated. FIG. 12(E) shows the replica after being removed from the master.

FIG. 13 is a schematic section view of one embodiment of the present invention's embossing method. FIG. 13(A) shows the master with textured surface and the replicating material on a substrate prior to embossing the replicating material with the master. FIG. 13(B) shows an embodiment of this method whereby a primer is optionally used between the replicating material and the substrate. FIG. 13(C) shows the textured master after being brought into contact with the replicating material. FIG. 13(D) shows an embossing force being applied to the combination of master, replicating material and substrate. FIG. 13(E) shows heat being applied. FIG. 13(F) shows the master and replicating material remaining in contact after being heated. FIG. 13(G) shows the combination of master, replicating material and substrate without the embossing force. FIG. 13(H) shows the combination of the substrate and replicating material after the master has been removed. FIG. 13(I) shows the resulting replica having a textured surface after being removed from the master and after being optionally separated from the substrate.

Figure 14:
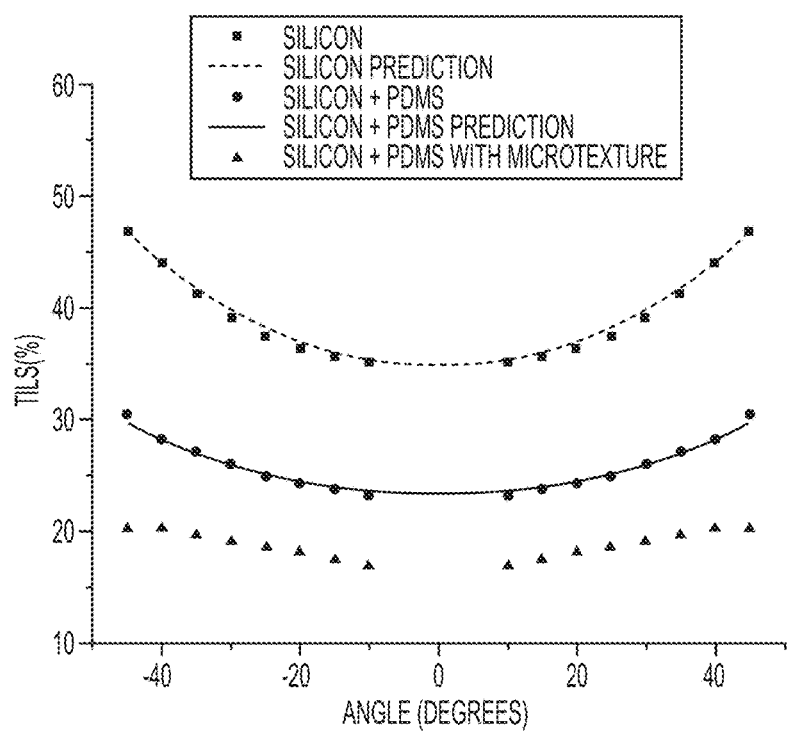

FIG. 14 shows a graph representing the TILS measurements (percent) are made while changing the angle of incidence (degrees) of the laser light to determine the effect of angle of incidence upon the TILS power of the microtextured PDMS on silicon surface.

The accompanying drawings, which are incorporated into and form a part of the instant specification, illustrate several aspects and embodiments of the present invention and, together with the description herein, serve to explain the principles of the invention. The drawings are provided only for the purpose of illustrating select embodiments of the invention and are not to be construed as limiting the invention.

DETAILED DESCRIPTION OF EXEMPLARY EMBODIMENTS OF THE INVENTION

Turning to FIG. 12, FIG. 12 schematically shows a method for replicating a surface having microtexture cones. Referring to FIG. 12(A), the method may include providing a master 6 with a textured surface 4 and a replicating material 2. The textured surface 4 of the master 6 may be comprised of a plurality of microtexture cones 7. Referring to FIG. 12(B), the method may include placing the replicating material 2 in conforming contact with the textured surface 4 of the master 6, heating 12 the replicating material 2 (as shown in FIG. 12(C)) for at least a portion of the time that it is in contact with the textured surface 4 of the master 6, removing the heat (as shown in FIG. 12(D), and removing the replicating material 2 from the textured surface 4 of the master 6 (as shown in FIG. 12(E)) to provide a replica 20 of the microtextured surface 4 of the master 6. The textured surface 22 of the replica 20 provides a plurality of microtexture cones 10. In an approach, the heating 12 of the replicating material 2 is performed for a predetermined time. Although not illustrated in FIG. 12, in an approach, a retention surface may be provided that is configured to retain the replicating material 2 about the master; see 8 in FIG. 1(A) for example. Such examples may be a wall, brace, or contatiner. FIG. 12(D) illustrates the arrangement whereby the heat source 12 has already been removed. It is possible that heat may be applied prior to the replicating material 2 being in contact with the master 6 or applied at least part of the time that it is in contact with the master. Alternatively, it may be a combination thereof whereby heat is applied prior to contact as well as while being in contact.

Although not shown, it should be appreciated that the textured surface 4 of the master 6 may be comprised of a plurality of various types of micron-scale structures (features) and/or nano-scale structures (features). Moreover, any of the plurality of micron-scale structures may have a variety of nano-scale surface features thereon or in communication there with. It should be appreciated that the various micron-scale and nano-scale structures can be achieved through a molding technique disclosed herein. Examples of other types of micron-scale and nano-scale structures that can be achieved through aspects of the molding technique disclosed herein include, but not limited thereto, grating or wire structure. For example, rather than the textured surface 4 of the master 6 being made of microtexture cones, it may instead be comprised of a grating or wire structure (or other suitable, desired or required structures or features). As such, the resultant textured surface 22 of the replica 20 would produce the corresponding mold of the grating or wire structure (or other suitable, desired or required structures or features).

An aspect of the embodiment of the present invention, as schematically shown in FIG. 13, is a method for replicating a surface having microtexture cones. Referring to FIG. 13(A), the method may include providing a substrate 14, a replicating material 2, a master 6 textured with a plurality of microtexture cones 7, and an embossing force 18, as shown in FIG. 13(D). As shown in FIGS. 13(A) and (C), the method may include placing the textured surface 4 of the master 6 in contact with the replicating material 2, applying an embossing force 18 (FIG. 13(D)) to the master 6, and heating 12 the combination (FIG. 13(E)). As identified in FIGS. 13(H) and (I), the textured surface 22 of the replica 20 provides a plurality of microtexture cones 10. The heat 12 may be reduced or eliminated (FIG. 13(F)), and the embossing force 18 is removed (FIG. 13(G)), and the master 6 is separated from the replicating material 2 (FIG. 13(H)), which provides a replica 20 (see FIGS. 13(H) and (I)) of the microtexture surface 4 of the master 6 without any additional processing steps to accomplish the separated replica. In an approach, the contact of the replicating material 2 with the substrate 14 is achieved by coating it with the replicating material 2. In an approach, the coating of the substrate 14 with the replicating material 2 is achieved by spin-coating the substrate 14 with the replicating material 2. In an approach, as shown in FIG. 13(B), a priming agent 400 is used in the contact of the substrate 14 and the replicating material 2. In an approach, the master 6 and the substrate 14 are heated 12 prior to the application of the embossing force 18.

Although not shown, it should be appreciated that the textured surface 4 of the master 6 may be comprised of a plurality of various types of micron-scale structures (features) and/or nano-scale structures (features). Moreover, any of the plurality of micron-scale structures may have a variety of nano-scale surface features thereon or in communication there with. It should be appreciated that the various micron-scale and nano-scale structures can be achieved through an embossing technique disclosed herein. Examples of other types of micron-scale and nano-scale structures that can be achieved through aspects of the embossing technique disclosed herein include, but not limited thereto, grating or wire structure. For example, rather than the textured surface 4 of the master 6 being made of microtexture cones, it may instead be comprised of a grating or wire structure (or other suitable, desired or required structures or features). As such, the resultant textured surface 22 of the replica 20 would produce the corresponding embossment of the grating or wire structure (or other suitable, desired or required structures or features).

In an approach, the replicating material 2 may include a polymer, a conductor, an optical cement, a metal, a glass, or a plexiglass. The replicating material 2 may have hydrophobic or conductive properties. In an approach, the master 6 may include a semiconductor or a metal. In an approach, the textured surface 4 of the master 6 may be produced by laser, machining, or chemical etching.

Referring to FIG. 10(A), in an approach, the textured surface 4 of the master 6 is characterized by microtexture cones 500 with nanoscale surface features 502. For example, the microtextures cones may have a period 504 that ranges from about 0 microns to about 50 microns, and the microtexture cones 500 may have a height 506 up to about 50 microns. A height of 100 microns or greater is possible. A period 504 of 100 microns or greater is possible. In an approach, the priming agent 400 is a silane primer or PR-1200.

Referring to FIG. 10(B), in an approach, the replica 20 has similar or identical features of the texture 4 on the master 6 (such as provided in FIG. 10(A)). Thus, the textured surface 22 of the replica 20 is characterized by microtexture cones 510 with nanoscale surface features 512. For example, the microtextures cones may have a period 514 that ranges from about 0 microns to about 50 microns, and the microtexture cones 510 may have a height 516 up to about 50 microns. A height of 100 microns or greater is possible. In an approach, the replica 20 provided is superhyrdophobic. In an approach, the superhyrdophobic replica 20 provides an anti-icing or self-cleaning component. In an approach, using the replica 20 to provide a superhyrdophobic element for prevention of the formation or accumulation of ice. In an approach, the replica 20 demonstrates decreased reflectivity after removal. It should be appreciated that the period and height may be a variety of dimensions and may be uniform or regular or may also be non-uniform such as stochastic, random, altered, varied or fluctuating.

It should be appreciated that the textured surface of the master may be comprised of a plurality of various types of micron-scale structures (features) and/or nano-scale structures (features). Moreover, any of the plurality of micron-scale structures may have a variety of nano-scale surface features thereon or in communication there with. It should be appreciated that the various micron-scale and nano-scale structures can be achieved through a molding or an embossing technique disclosed herein. Examples of other types of micron-scale and nano-scale structures that can be achieved through aspects of the molding or embossing techniques disclosed herein include, but not limited thereto, grating or wire structure. For example, rather than the textured surface of the master being made of microtexture cones, it may instead be comprised of a grating or wire structure (or other suitable, desired or required structures or features). As such, the resultant textured surface of the replica would produce the corresponding mold or embossment of the grating or wire structure (or other suitable, desired or required structures or features).

In an approach, using the replica 20 to provide an element to control light reflection or transmission in an optoelectronic device. In an approach, the replica 20 may be used to provide an element to control light reflection, transmission, absorption, and/or scattering in an optoelectronic device, optical device or other suitable or desired device. In an approach, the optoelectronic device may be a photodetector, photovoltaic cell, sensor, optical device, electronic device, photonic device, or part of a sensor application. In an approach, the replica 20 may be used to provide a protective layer in an optoelectronic device. In an approach, the replica 20 may be used to provide an element for controlled cell growth.

EXAMPLES

Practice of an aspect of an embodiment (or embodiments) of the invention will be still more fully understood from the following examples and experimental results, which are presented herein for illustration only and should not be construed as limiting the invention in any way.

Example and Experimental Set No. 1

For this work polydimethylsiloxane (PDMS) was obtained from Ellsworth Adhesives (Dow Corning Sylgard 184 Silicone Encapsulant). This is a two-part mix comprised of a base and a hardener that are mixed together at a 10:1 ratio. We chose to mix by mass and a milligram scale was used get the ratio as accurate as possible. Care should be taken when dispensing the base to minimize the addition of air bubbles as any bubbles will need to be eliminated by vacuum desiccation.

Figure 1A:
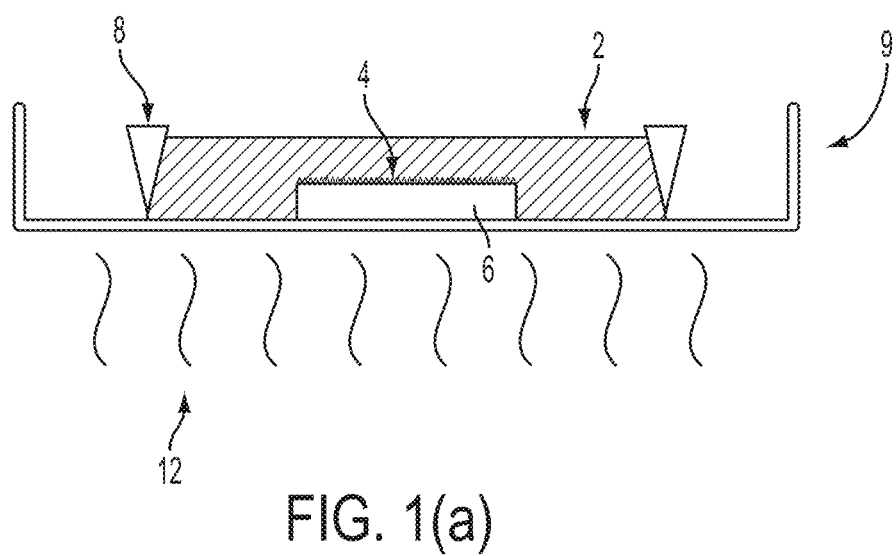
FIG. 1 schematically shows longitudinal section views of and samples resulting from the experimental setups. FIG.
FIGS. 1(B) and 1(C) show depictions of the embossing method as carried out in Experiment 2.
FIGS. 1(D) and 1(E) show the replicas resulting from the mold method and the embossing method, respectively.

As schematically shown in FIG. 1(A), surface replication capabilities of PDMS 2 (replicating material) were performed by making a mold of PDMS 2 using a 30 mm nylon washer 8 (nylon mold) used as a retention member in a 50 mm Petri dish 9 with the textured surface 4 of the master 6 placed texture-surface up. Two types of masters 6 with textured surfaces 4, Si and Ti, were replicated. Optical characterization of the replicated textured surfaces 22 is presented (as shown in FIG. 2(D), and use of the replicated textured surface 22 as an optical device that scatters preferentially in the forward direction with very little backscattering (<5%) is demonstrated (as shown in FIG. 5(B)).

The Petri dish 9 is placed on a heat 12 source, which in this experiment was a hot plate, to cure for 1.5 hours at 80° C. After curing the PDMS 2 is removed from the Petri dish 9 and the master 6 is carefully separated from the PDMS 2. In our experiment, the initial PDMS replicas 20 were made 3-5 mm thick to facilitate handling. This allowed the master 6 to be separated from the PDMS 2 by bending the PDMS replica 20 slowly, taking care not to induce cracking.

FIG. 1(D) shows an example of the results that can be obtained using the above molding procedure. This particular example shows the textured surface 22 of the replica 20 that was prepared using a Ti master 6 and cured for 1.5 hours at 80° C.

Example and Experimental Set No. 2

Figure 1B:
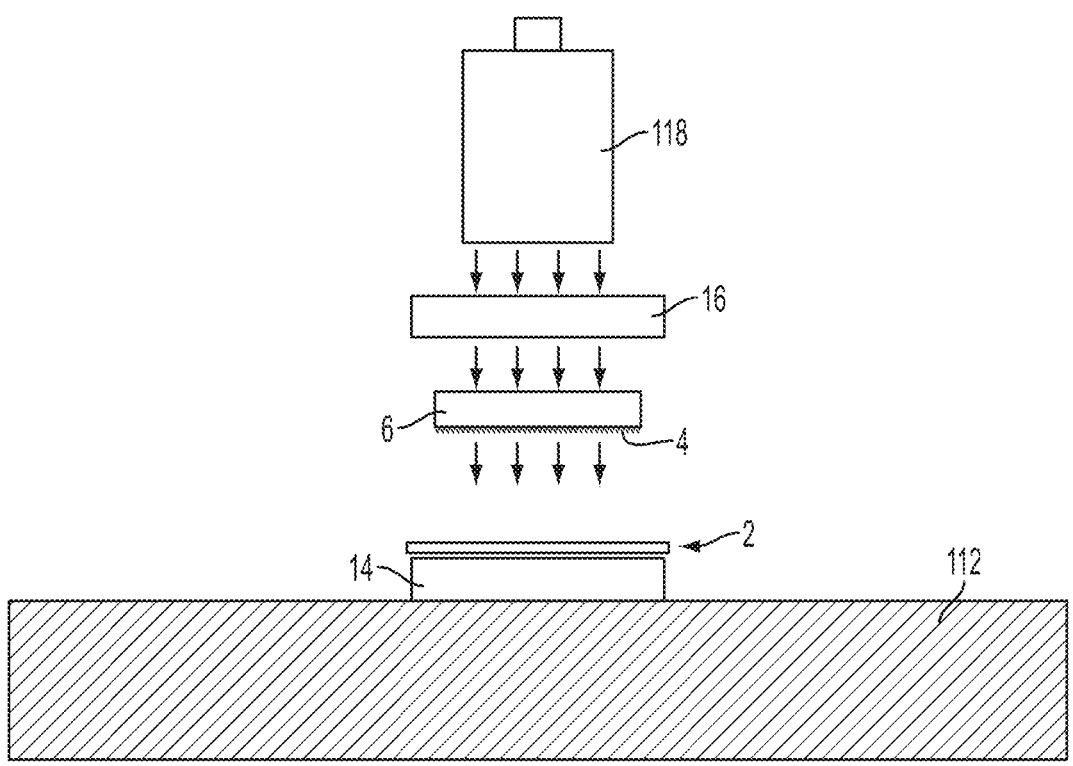
Figure 1C:
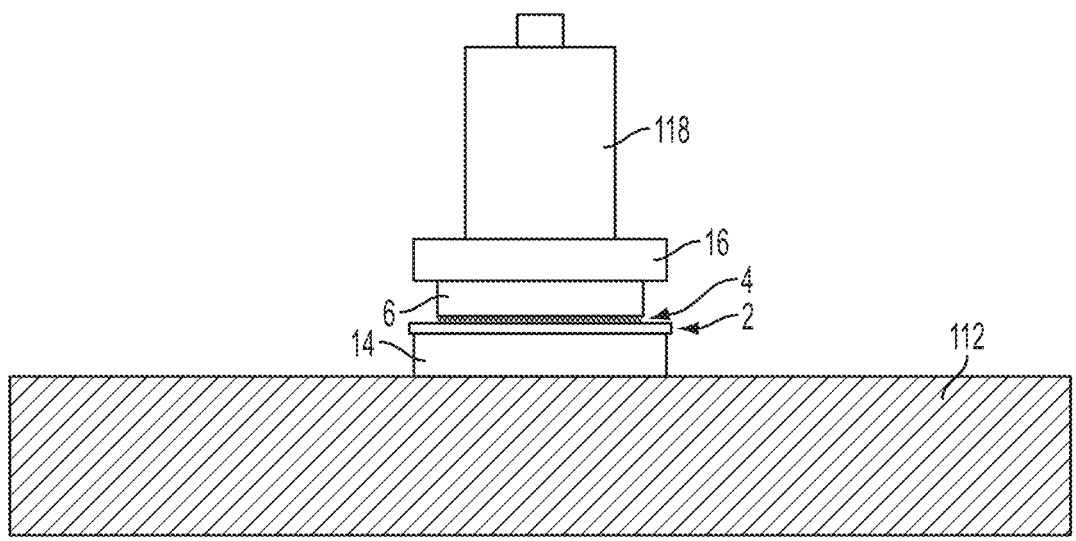
Figure 1:
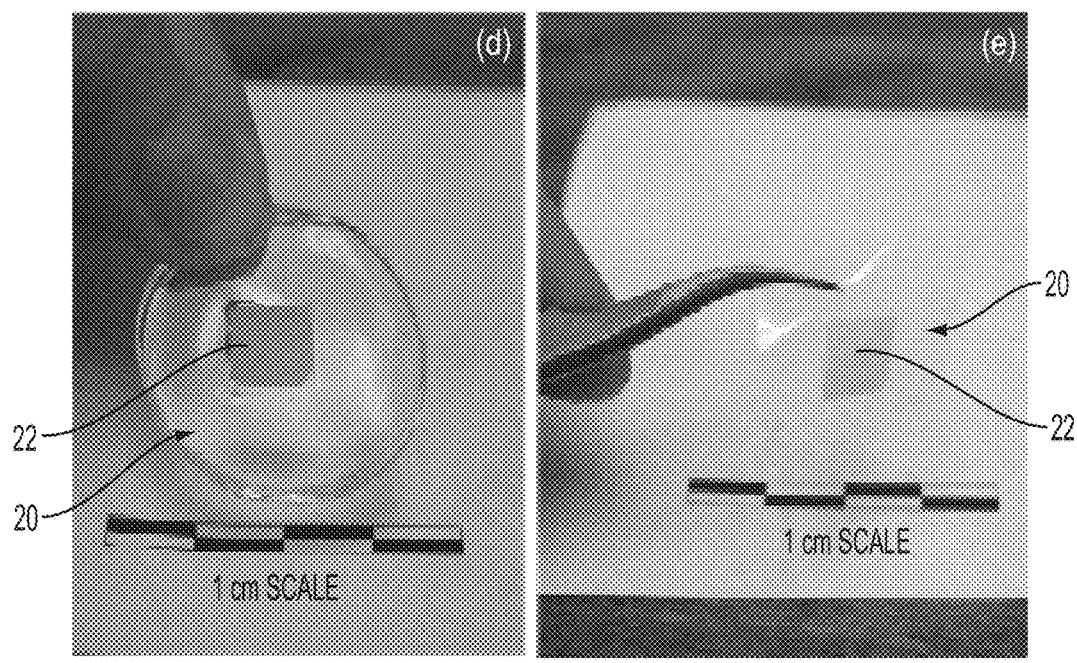

Turning to FIG. 1(B)-(C), a method was developed to replicate the textured surface 4 of a master 6 onto a substrate 14 using an embossing technique. Several variables were determined.
1. The thickness of the initial PDMS coating 2 (PDMS layer) which is determined by the type of substrate 14, duration, and speed of the spin-coating process.
    a. Glass substrate 14: 20 seconds @ 1850 RPM giving a thickness of approx 190 μm
    b. Silicon substrate 14: 20 seconds @ 1000 RPM giving a thickness of approx 190 μm.
2. The overall cure temperature of 70° C.
3. The duration of the delay to allow the thin film 2 to recover prior to the initial cure of greater than 10 minutes.
4. The duration of the initial cure time prior to embossing, 3 minutes.
5. The amount of weight or embossing force applied during the embossing process, which in this experiment was a 200 g mass 118.
6. The final cure time of greater than 15 minutes.

In an approach, an important aspect of the above variables may be item number 4, the initial cure time before the embossing. It was found that waiting too long resulted in little or no surface texture after embossing whereas waiting too short resulted in a master 6 firmly embedded in the substrate 14 requiring careful and extensive clean-up. It should be appreciated that minimum and maximum duration for curing may be dependent upon the temperature. For example, for 70 degrees Celsius we found the range of 3 to 5 minutes to be a useful range. It should be appreciated that the duration for curing may be longer or shorter depending on the temperature as well as other associated factors.

The procedure (see FIG. 1(B)) involves depositing a thin film by spin-coating approximately 190 μm of PDMS 2 onto the substrate 14. This thin film 2 must be allowed to recover from the spin-coating process as depending of the choice of substrate 14 and the associated wetting characteristics of the material, the thin-film 2 may be slightly concave (Glass) or convex (Si) in nature, the exact delay time is not critical but in an approach it should be greater than 10 minutes.

The substrate 14 is then placed on the hot plate 112 at 70° C. for four minutes. This pre-emboss cure prevents the PDMS 2 from sticking to the master 6 when the master 6 is applied to the PDMS 2 layer. Referring to FIG. 1(C), after the pre-emboss cure the master 6 is placed on the substrate 14 with the texture side 4 face-down on the PDMS layer 2. A glass slide 16 was then placed over the master 6 and a 200 g mass 118 placed on top to provide the embossing force. The complete stack including the substrate 14, PDMS layer 2, master 6, glass slide 16 and the 200 g mass 118 are now left on the hot plate 112 for the final cure time of at least 15 minutes as shown in FIG. 1(C).

When the cure time is complete the weight 118 and glass slide 16 is removed. The master 6 is then carefully pried off the substrate 14 using a very fine set of tweezers (Techni-Tool Type 2AB). It can be difficult to separate the master 6 from the PDMS 2 layer and care must be taken to avoid separation of the PDMS 2 layer from the substrate 14. A priming agent such as Dow Corning PR-1200 may be used to improve bonding of the PDMS 2 to the substrate 14, although we did not use a primer for this particular set of samples.

Related Results of Experiments No. 1 and 2

FIG. 1(E) shows an example of the results that can be obtained using the above embossing procedure (discussed in reference to FIGS. 1(B)-(C)); this particular example shows the textured surface 22 that was produced in the 190 µm film 20 that has been embossed using a Ti master 6.

Figure 2:
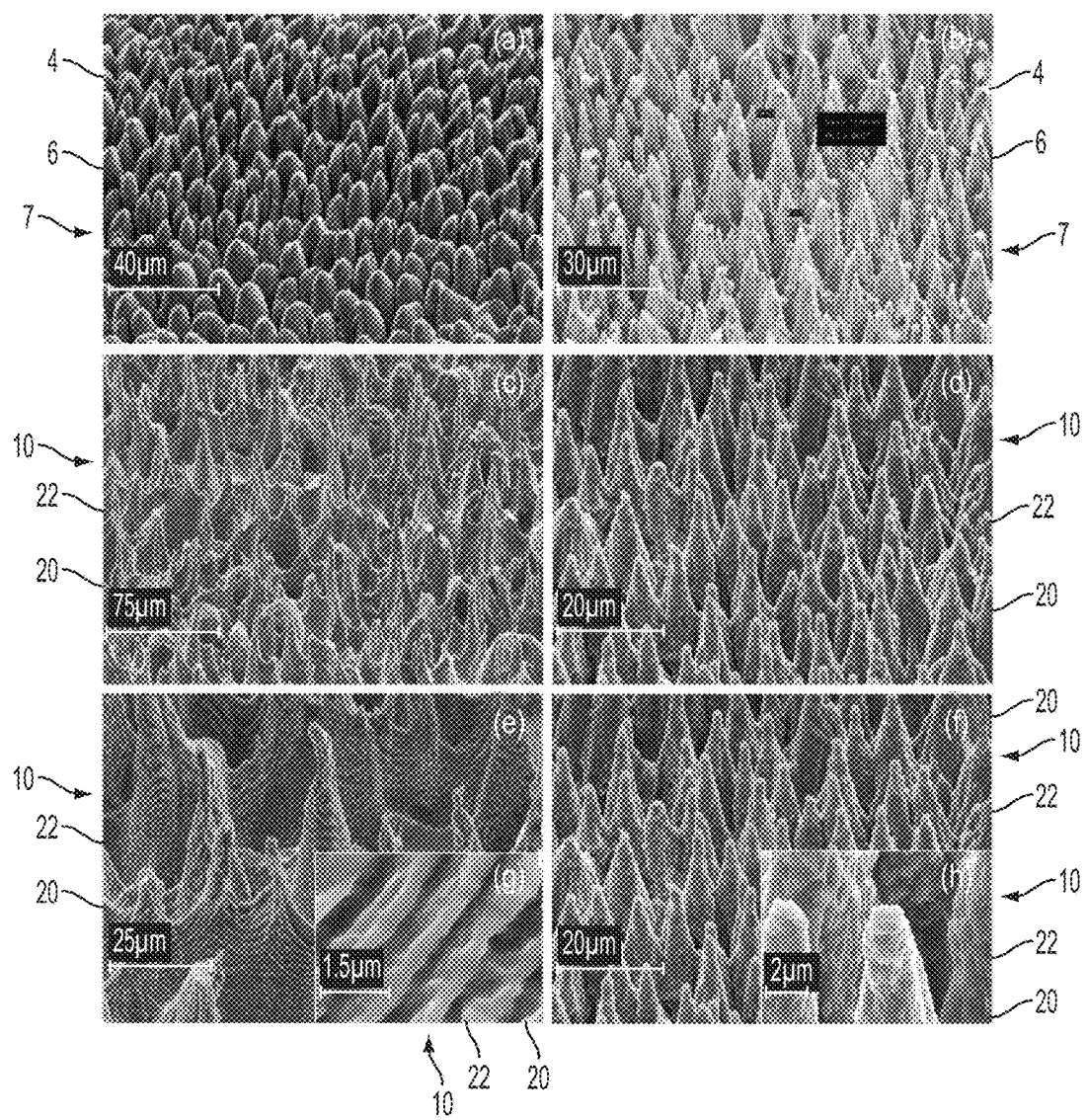
FIG. 2 shows scanning electron microscope (SEM) images of the Experimental Results.

FIGS. 2 (A) and (B) show SEM images of Ti textured surface 4 and Si textured 4 surfaces of the master 6, respectively, that have been irradiated with an ultrafast laser source in a manner demonstrated previously [See, for example, reference nos. 17-19 listed below]. The image shown in FIGS. 2(C) and (D) show the replicated PDMS surface 22 for respective Ti and Si textured surfaces 4 of the masters 6. These results were demonstrated by producing a mold of the textured master 6 as detailed in the experimental section and shown in FIG. 1(A). Upon detailed examination it was seen that the sub-micron detail on the surface of the master 6 having conical structures (such as microstrucutre cones 7) was duplicated as the textured surface 22 of the replica 20 as replicated structures as defined as microtexture cones 10. Of particular interest is the detail visible in the SEM images of FIGS. 2(E) and 2(F) and their corresponding exploded insets (FIGS. 2(G) and 2(H)) of the Ti and Si molds, respectively. The SEM images clearly show detail replication at the nano-scale of textured surface 22 of the replica 20 with microtexture cones 10. The simplicity of the replication process and the fidelity of the replication encouraged the development of an embossing process with the goal of replicating these features on the surface of some useful substrate.

The embossing process is explained above and shown in FIG. 1(B) and FIG. 1(C). An example of the results of the embossing process is shown in FIG. 1(E) which shows a thin film of PDMS 20 with the embossed surface texture 22. As discussed above, this thin film 20 was made using a glass substrate 14 and the film 20 was carefully removed from the substrate 14 for analysis.

Figure 3A:
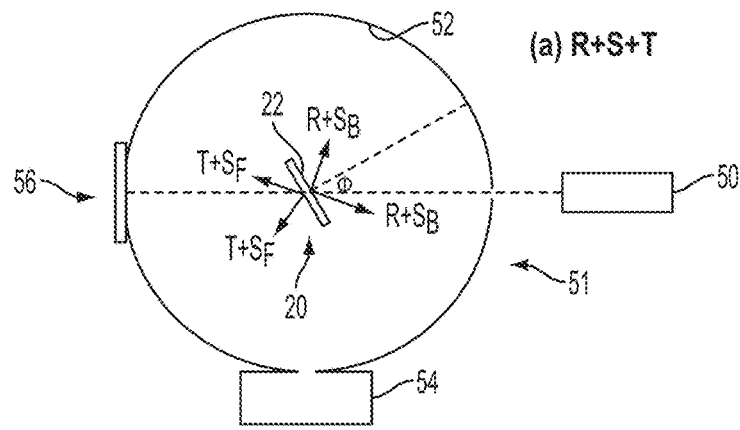
FIG. 3 shows the optical analysis performed on the textured silicon using an integrating sphere as (RTC-060-SF Labsphere, Inc.) described in the experimental results section. The Total Integrated Scattering (TIS) field is measured R+S+T as shown in FIG. 3(A). The scattering field can be further broken down into the reflected plus backscattered field (R+$S_B$) as shown in FIG. 3(B) and the transmitted plus forward scattered field (T+$S_F$) as shown in FIG. 3(C).
Figure 3B:
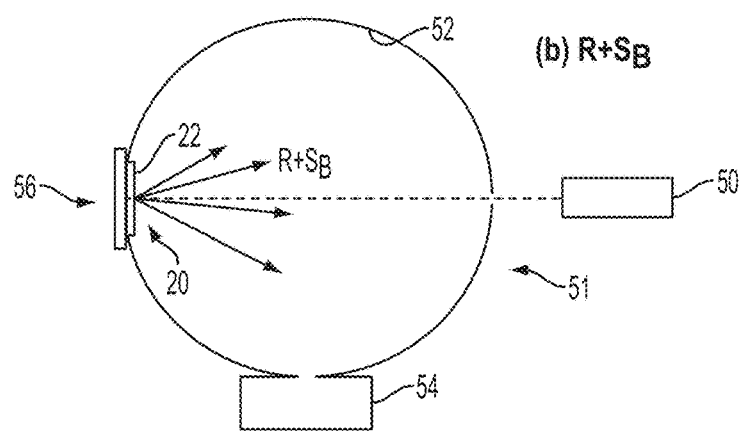
Figure 3C:
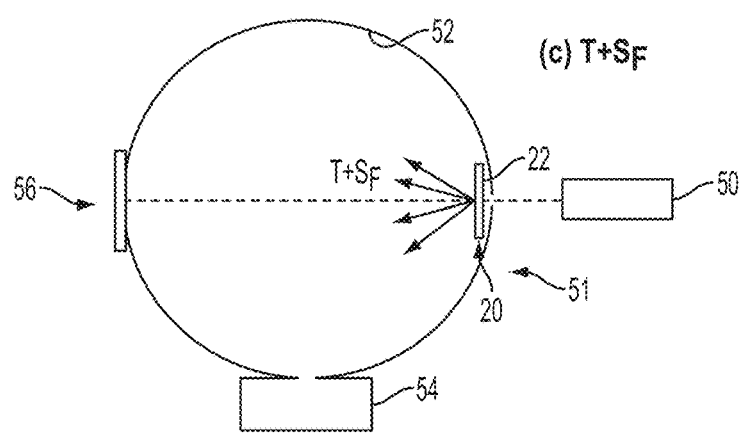

Optical analysis of textured silicon has been performed in the past using an integrating sphere 51 with a standard (spectraflect) coating 56 and detector 54. Turning to FIG. 3, analysis of the PDMS textured surface 22 (i.e., textured replica) was performed using an integrating sphere (Model: RTC-060-SF from labSphere Inc.) 51 with Spectraflect® coating 52 or other type of spectraflect surface. The Total Integrated Scattering (TIS) field is measured R+S+T as shown in FIG. 3(A). The Integrating sphere 51 also allows the angle of incidence Φ to be adjusted and the results of this analysis are shown in Table 1. The scattering field can be further broken down into the reflected R plus backscattered $S_b$ field (R+$S_B$) as shown in FIG. 3(B) and the transmitted T plus forward scattered $S_c$ field (T+$S_F$) as shown in FIG. 3(C). Of particular interest is the R+$S_B$ field. This shows that the PDMS textured material 20 (textured surface of replica) scatters preferentially in the forward direction with very little backscattering (<5%).

TABLE 1

Optical characterization results from Integrating sphere measurements.

| | T + $S_F$ (%) | T + S (%) | R + $S_B$ (%) |
|---|---|---|---|
| PDMS Texture | 96.2 | 97.0 | 4.9 |
| Glass + PDMS texture | 93.1 | 94.3 | 5.2 |
| Silicon + PDMS Texture | 0 | 16.9 | 15.7 |

Figure 4:
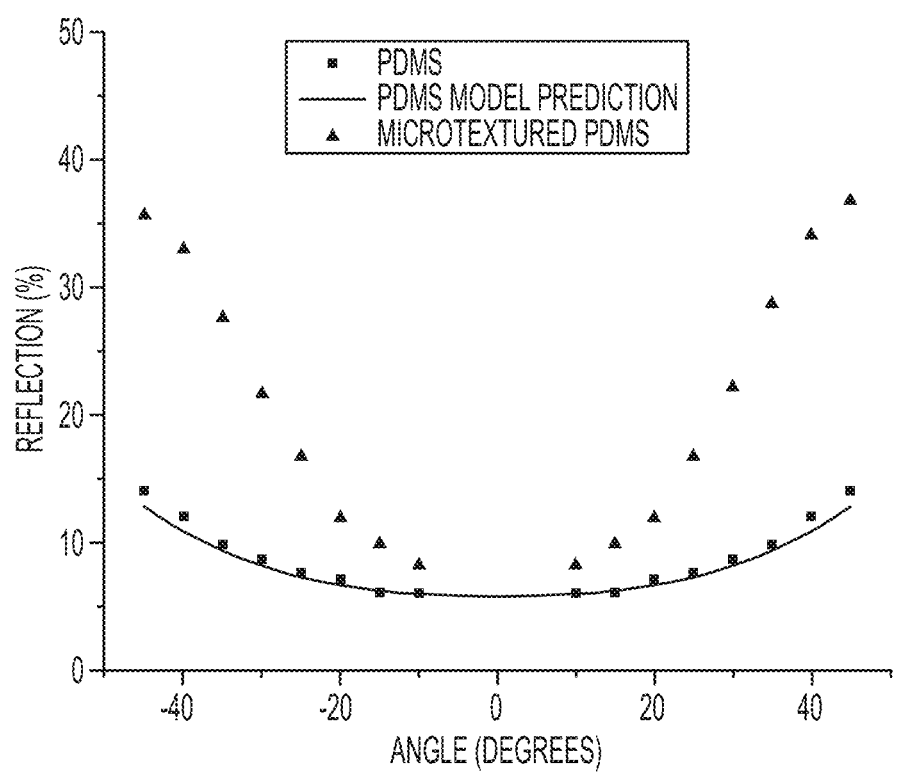
FIG. 4 shows a graph representing the dependence of angle of incidence (degrees) on the reflectance (percentage) is shown and comparison is shown between PDMS film, PDMS film predicted value and, microtextured PDMS.

FIG. 4 shows the results of the integrating sphere characterization of the microtextured PDMS surface. FIG. 4 shows a graph representing the dependence of angle of incidence (degrees) on the reflectance (percentage) is shown and comparison is shown between PDMS film, PDMS film predicted value and, microtextured PDMS of the experiments. The black paper used as an absorber for transmitted light, reflects/scatters an average of 8% of the incident light. The use of the absorber allows measurement of the angular dependence of the reflected/scattered light using the integrating sphere. The total reflection for the microtextured PDMS is smaller than the data shown in FIG. 4 as there is a light coupling phenomenon which allows light to escape from the edge of the film that is added to the integrating sphere power value.

Based on the results of the integrating sphere characterization of the microtextured PDMS, a microtextured PDMS film is applied to a polished silicon surface as an antireflection type layer for photovoltaic applications. The microtextured side of the PDMS film is applied facing up. FIG. 14 shows a graph representing the TILS measurements (percent) are made while changing the angle of incidence (degrees) of the laser light to determine the effect of angle of incidence upon the TILS power of the microtextured PDMS on silicon surface. The measured values compare very well to the value generated from a PV Optics model simulation [See, for example, reference no. 34 listed below]. The results of these measurements are displayed in FIG. 14. The data shows that the reflectivity is extremely flat over a wide range of angles of incidence and the measured values are very close to the predicted values.

Figure 5A:
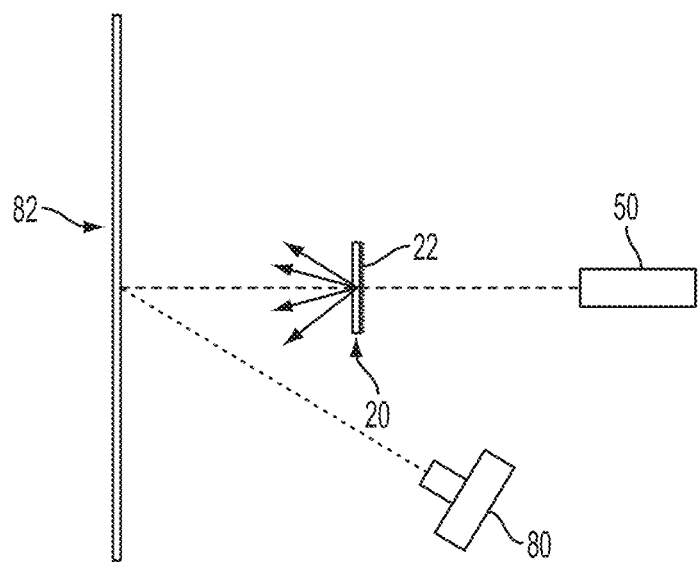
FIG. 5 depicts the experimental setup for visually examining the forward scattering field (FIG. 5(A)) and backward scattering field (FIG. 5(B)) for the PDMS textured film, with the textured side towards the illumination, using digital photography with a Canon EOS 300D camera.
Figure 5B:
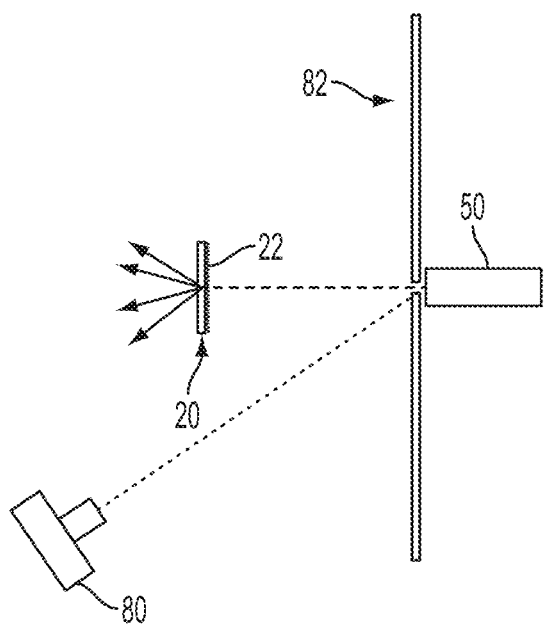

Analysis was further expanded by use of the experimental set up shown in FIG. 5 having a screen 82 and laser 50. The forward scattering field $S_f$ (from FIG. 3) and backward scattering $S_b$ field (from FIG. 3) were examined visually for the PDMS textured film 20 (replica), with the textured side 22 (textured surface of replica) towards the illumination, by digital photography using a Canon EOS 300D camera 80. Each image has identical exposure time (6 seconds) and is processed in an identical fashion (Microsoft Office Picture Manager, brightness+65, contrast+100). As shown in FIG. 6(A), the forward scattering field $S_f$ (from FIG. 3) shows a well developed scattered field with no transmitted laser dot visible, whereas turning to FIG. 6(B), the backward scattered field $S_b$ (from FIG. 3) shows very little illumination. This phenomenon was further investigated by analyzing the histograms of the digital images (of FIGS. 6(A) and 6(B)) using image processing software (ImageJ) using the plot profile [See, for example, reference no. 20 listed below] feature. The plot profile feature allows the image to be broken down into vertical sections where the total integrated flux for each line is plotted as a histogram. This allows a quantitative analysis to be performed when comparing the images. Turning to FIG. 7(B), this analysis shows the minimal backward scattered field 58 (from FIG. 3) when compared with—as shown in FIG. 7(A)—the forward scattered field $S_f$ (from FIG. 3). Examining the backward scattering histogram of FIG. 7(B), all that is visible is the central spike with no Gaussian scattering pattern.

Similar photographic analysis was performed with the non-textured side of the PDMS film 20 towards the illumination by processing the images shown in FIGS. 6(C) and 6(D), which shows the minimal backward scattered field of FIG. 7(D) of the textured side when compared with the forward scattered field of FIG. 7(C). The results for the forward scattered field $S_f$ (from FIG. 3) and the backward scattered fields $S_b$ (from FIG. 3) are shown in FIG. 6(C) and FIG. 6(D) respectively. As shown in FIG. 6(C), there is a significant backward scattered field $S_b$ (from FIG. 3) in addition to the expected reflected component (which lined up with the window of the laser 50 (of FIG. 3)). The non-textured side digital images were further analyzed, comparing the ImageJ plot profiles and the result here is very dramatic when FIG. 7(B) is compared with FIG. 7(D) the scattering Gaussian curve of FIG. 7(B) is completely absent from FIG. (D).

FIG. 8 provides an SEM image of the textured cones 10 of a PDMS replica 20 produced in experiments.

FIG. 9 a microscopy image illustrating the wetting properties of the textured surface using a water droplet 13 on a microtexture cone-textured surface 4 (as provided by an embodiment of the present invention) of the replica 20. For instance, water de-wetting properties of replicated micro/nano textures have been measured with contact angles of greater than 150 degrees providing the superhydrophobic characteristics as represented by FIG. 9.

FIG. 11 is a schematic section view of a water droplet 600 on textured surface 22 of a replica 20 with the microtextured cones 10 (as provided by an embodiment of the present invention) and the associated wetting angle 602.

Replication of ultrafast laser induced micro/nano structures is demonstrated. This replication can be accomplished in materials such as PDMS. Different types of micro/nano structures have been replicated using two different material systems such as textured Ti and Si substrates. The optical properties of the replicated structures have been analyzed and demonstrate very novel and unique unidirectional scattering behavior showing near zero backward scattering. This behavior of near-zero backward scattering has many potential applications and constitutes a new class of optical device. The process demonstrated above is relatively easy to adapt to industrial scale.

Additional Examples

Example 1 includes a method for replicating at least one master having at least one textured surface, wherein the at least one textured surface is textured with microtexture cones. The method comprising: providing at least one replicating material; placing the at least one replicating material in conforming contact with the at least one textured surface; heating the at least one replicating material for at least a portion of the time that the at least one replicating material is in contact with the at least one textured surface of the at least one master; and removing the at least one replicating material from the at least one textured surface to provide a replica of the microtextured surface of the at least one master, wherein the replica comprises a surface with microstructure cones.

Example 2 includes the method of example 1, wherein the heating is performed for a predetermined time.

Example 3 includes the method of example 1 (as well as subject matter of one or more of any combination of examples 1-2), wherein the at least one replicating material is hydrophobic.

Example 4 includes the method of example 3 (as well as subject matter of one or more of any combination of examples 1-2), wherein the replica is superhydrophobic.

Example 5 includes the method of example 4 (as well as subject matter of one or more of any combination of examples 1-4), wherein the superhydrophobic replica provides an anti-icing component.

Example 6 includes the method of example 4 (as well as subject matter of one or more of any combination of examples 1-5), wherein the superhydrophobic replica provides a self-cleaning component.

Example 7 includes the method of example 1 (as well as subject matter of one or more of any combination of examples 1-6), wherein the at least one replicating material is a polymer.

Example 8 includes the method of example 1 (as well as subject matter of one or more of any combination of examples 1-7), wherein the at least one replicating material is a conductive material.

Example 9 includes the method of example 1 (as well as subject matter of one or more of any combination of examples 1-8), wherein the replica has enhanced diffusive properties after the removal.

Example 10 includes the method of example 1 (as well as subject matter of one or more of any combination of examples 1-9), wherein the replica has decreased reflectivity after the removal.

Example 11 includes the method of example 1 (as well as subject matter of one or more of any combination of examples 1-10), wherein the at least one replicating material is an optical cement.

Example 12 includes the method of example 1 (as well as subject matter of one or more of any combination of examples 1-11), wherein the at least one replicating material is metal.

Example 13 includes the method of example 1 (as well as subject matter of one or more of any combination of examples 1-12), wherein the at least one replicating material is glass.

Example 14 includes the method of example 1 (as well as subject matter of one or more of any combination of examples 1-13), wherein the at least one replicating material is plexiglass.

Example 15 includes the method of example 1 (as well as subject matter of one or more of any combination of examples 1-14), wherein the at least one master comprises a semiconductor material.

Example 16 includes the method of example 1 (as well as subject matter of one or more of any combination of examples 1-15), wherein the at least one master comprises a metal material.

Example 17 includes the method of example 1 (as well as subject matter of one or more of any combination of examples 1-16), further comprises providing a retention surface that is configured to retain the replicating material about the at least one master.

Example 18 includes the method of example 1 (as well as subject matter of one or more of any combination of examples 1-17), further comprises removing the heat prior to or after the removal of the at least one replicating material from the at least one textured surface.

Example 19 includes the method of example 1 (as well as subject matter of one or more of any combination of examples 1-18), wherein the at least one textured surface of the at least one master is laser produced.

Example 20 includes the method of example 1 (as well as subject matter of one or more of any combination of examples 1-19), wherein the at least one textured surface of the at least one master is produced by a machining process or chemical etching process.

Example 21 includes the method of example 1 (as well as subject matter of one or more of any combination of examples 1-20), wherein the microtexture cones of the at least one master include nanoscale features on their surfaces.

Example 22 includes the method of example 1 (as well as subject matter of one or more of any combination of examples 1-21), wherein the microtexture cones of the at least one master have a period that ranges from greater than 0 microns to about 50 microns.

Example 23 includes the method of example 1 (as well as subject matter of one or more of any combination of examples 1-22), wherein the microtexture cones of the at least one master have a period that ranges from about 5 microns to about 15 microns.

Example 24 includes the method of example 1 (as well as subject matter of one or more of any combination of examples 1-23), wherein the microtexture cones of the at least one master have a height greater than 0 microns to about 50 microns.

Example 25 includes the method of example 1 (as well as subject matter of one or more of any combination of examples 1-24), wherein the microtexture cones of the at least one master have a height of about 10 microns to about 40 microns.

Example 26 includes the method of example 1 (as well as subject matter of one or more of any combination of examples 1-25), wherein the microtexture cones of the replica include nanoscale features on their surfaces.

Example 27 includes the method of example 1 (as well as subject matter of one or more of any combination of examples 1-26), wherein the microtexture cones of the replica have a period that ranges from greater than 0 microns to about 15 microns.

Example 28 includes the method of example 1 (as well as subject matter of one or more of any combination of examples 1-27), wherein the microtexture cones of the replica have a period that ranges from about 5 microns to about 15 microns.

Example 29 includes the method of example 1 (as well as subject matter of one or more of any combination of examples 1-28), wherein the microtexture cones of the replica have a height of greater than 0 microns to about 50 microns.

Example 30 includes the method of example 1 (as well as subject matter of one or more of any combination of examples 1-29), wherein the microtexture cones of the replica have a height of about 10 microns to about 40 microns.

Example 31 includes the method of using the replica of example 1 (as well as subject matter of one or more of any combination of examples 1-30) to provide an element to control light reflection in an optoelectronic device.

Example 32 includes the method of using the replica of example 1 (as well as subject matter of one or more of any combination of examples 1-31) to provide an element to control light transmission in an optoelectronic device.

Example 33 includes the method of using the replica of example 1 (as well as subject matter of one or more of any combination of examples 1-32) to provide an element to control light absorption in an optoelectronic device.

Example 34 includes the method of using the replica of example 1 (as well as subject matter of one or more of any combination of examples 1-33) to provide an element to control light scattering in an optoelectronic device.

Example 35 includes the method of using the replica of example 1 (as well as subject matter of one or more of any combination of examples 1-34) to provide an element to control light reflection, transmission, absorption, and scattering in an optoelectronic device.

Example 36 includes the method of example 31 (as well as subject matter of one or more of any combination of examples 1-35), wherein the optoelectronic device comprises at least one of: photodetector, photovoltaic cell, photoconductive devices, sensor application, sensor, optical device, electronic device, or photonic device.

Example 37 includes the method of using the replica of example 1 (as well as subject matter of one or more of any combination of examples 1-36) to provide a protective layer in an optoelectronic device.

Example 38 includes the method of using the replica of example 1 (as well as subject matter of one or more of any combination of examples 1-37) to provide an element for controlled cell growth.

Example 39 includes the method of using the replica of example 1 (as well as subject matter of one or more of any combination of examples 1-38) to provide a superhyrdophobic element for preventing the formation or accumulation of ice.

Example 40 includes the method of using the replica of example 1 (as well as subject matter of one or more of any combination of examples 1-39) to provide an element to control light reflection in an optical device.

Example 41 includes the method of using the replica of example 1 (as well as subject matter of one or more of any combination of examples 1-40) to provide an element to control light transmission in an optical device.

Example 42 includes the method of using the replica of example 1 (as well as subject matter of one or more of any combination of examples 1-41) to provide an element to control light absorption in an optical device.

Example 43 includes the method of using the replica of example 1 (as well as subject matter of one or more of any combination of examples 1-42) to provide an element to control light scattering in an optical device.

Example 44 includes the method of using the replica of example 1 (as well as subject matter of one or more of any combination of examples 1-43) to provide an element to control light reflection, transmission, absorption, and scattering in an optical device.

Example 45 includes the method of using the replica of example 1 (as well as subject matter of one or more of any combination of examples 1-44) to provide a protective layer in an optical device.

Example 46 includes a method for replicating at least one master having at least one textured surface, wherein the at least one textured surface is textured with microtexture cones. The method comprising: providing at least one replicating material; placing the at least one replicating material in conforming contact with the at least one textured surface; heating the at least one replicating material; removing the at least one replicating material from the at least one textured surface to provide a replica of the microtextured surface of the at least one master, wherein the replica comprises a surface with microstructure cones.

Example 47 includes the method of example 46, wherein the heating the at least one replicating material occurs for at least a portion of the time prior to the at least one replicating material is in contact with the at least one textured surface of the at least one master.

Example 48 includes the method of example 46, wherein the heating the at least one replicating material occurs for at least a portion of the time that the at least one replicating material is in contact with the at least one textured surface of the at least one master.

Example 49 includes the method of example 48, wherein the heating the at least one replicating material occurs for at least a portion of the time prior to and during the at least one replicating material is in contact with the at least one textured surface of the at least one master.

Example 50 includes a method for replicating at least one master having at least one textured surface, wherein the at least one textured surface is textured with microtexture cones. The method comprising the following steps: providing at least one substrate; providing at least one replicating material, wherein the at least one replicating material is in communication with the at least one substrate; placing the at least one textured surface of the at least one master in contact with the at least one replicating material; applying an embossing force to the combination of the at least one master, the at least one replicating material, and the at least one substrate; heating at least one of the at least one master, the at least one replicating material, and the at least one substrate; reducing or eliminating the heating; removing the embossing force; and separating the at least one master from the at least one replicating material to directly provide a replica of the microtextured surface of the at least one master, without any additional processing steps to accomplish the replica, and wherein the replica comprises a surface with microtexture cones.

Example 51 includes the method of example 50, wherein the at least one replicating material is a polymer.

Example 52 includes the method of example 50 (as well as subject matter of example 51), wherein the at least one replicating material is hydrophobic.

Example 53 includes the method of example 52 (as well as subject matter of one or more of any combination of examples 50-52), wherein the replica is superhydrophobic.

Example 54 includes the method of example 53 (as well as subject matter of one or more of any combination of examples 50-53), wherein the superhydrophobic replica provides an anti-icing component.

Example 55 includes the method of example 53 (as well as subject matter of one or more of any combination of examples 50-54), wherein the superhydrophobic replica provides a self-cleaning component.

Example 56 includes the method of example 50 (as well as subject matter of one or more of any combination of examples 50-55), wherein the at least one replicating material comprises a metal material.

Example 57 includes the method of example 50 (as well as subject matter of one or more of any combination of examples 50-56), wherein the at least one replicating material comprises a semiconductor material.

Example 58 includes the method of example 50 (as well as subject matter of one or more of any combination of examples 50-57), wherein the at least one replicating material comprises a glass material.

Example 59 includes the method of example 50 (as well as subject matter of one or more of any combination of examples 50-58), wherein the at least one replicating material comprises a plexiglass material.

Example 60 includes the method of example 50 (as well as subject matter of one or more of any combination of examples 50-59), wherein the at least one replica has enhanced diffusive properties after the removal.

Example 61 includes the method of example 50 (as well as subject matter of one or more of any combination of examples 50-60), wherein the at least one replica has decreased reflectivity after the removal.

Example 62 includes the method of example 50 (as well as subject matter of one or more of any combination of examples 50-61), wherein the at least one replicating material comprises a conductive material.

Example 63 includes the method of example 50 (as well as subject matter of one or more of any combination of examples 50-62), wherein the communication is achieved by coating the substrate with the replicating material.

Example 64 includes the method of example 63 (as well as subject matter of one or more of any combination of examples 50-63), wherein the coating includes a spin coating method.

Example 65 includes the method of example 50 (as well as subject matter of one or more of any combination of examples 50-64), wherein the communication includes a priming agent.

Example 66 includes the method of example 65 (as well as subject matter of one or more of any combination of examples 50-65), wherein the priming agent is a silane primer.

Example 67 includes the method of example 65 (as well as subject matter of one or more of any combination of examples 50-66), wherein the priming agent is PR-1200.

Example 68 includes the method of example 50 (as well as subject matter of one or more of any combination of examples 50-67), wherein the heating is performed prior to applying the embossing force.

Example 69 includes the method of example 50 (as well as subject matter of one or more of any combination of examples 50-68), wherein the heating is performed for a predetermined time.

Example 70 includes the method of example 50 (as well as subject matter of one or more of any combination of examples 50-69), wherein the at least one textured surface of the at least one master is laser produced.

Example 71 includes the method of example 50 (as well as subject matter of one or more of any combination of examples 50-70), wherein the at least one textured surface of the at least one master is produced by a machining process or chemical etching process.

Example 72 includes the method of example 50 (as well as subject matter of one or more of any combination of examples 50-71), wherein the microtexture cones of the at least one the master includes nanoscale features on its surface.

Example 73 includes the method of example 50 (as well as subject matter of one or more of any combination of examples 50-72), wherein the microtexture cones of the at least one master have a period that ranges from greater than 0 microns to about 50 microns.

Example 74 includes the method of example 50 (as well as subject matter of one or more of any combination of examples 50-73), wherein the microtexture cones of the at least one master have a period that ranges from about 5 microns to about 15 microns.

Example 75 includes the method of example 50 (as well as subject matter of one or more of any combination of examples 50-74), wherein the microtexture cones of the at least one master have a height greater than 0 microns to about 50 microns.

Example 76 includes the method of example 50 (as well as subject matter of one or more of any combination of examples 50-75), wherein the microtexture cones of the at least one master have a height of about 10 microns to about 40 microns.

Example 77 includes the method of example 50 (as well as subject matter of one or more of any combination of examples 50-76), wherein the microtexture cones of the replica include nanoscale features on its surface.

Example 78 includes the method of example 50 (as well as subject matter of one or more of any combination of examples 50-77), wherein the microtexture cones of the replica have a period that ranges from greater than 0 microns to about 15 microns.

Example 79 includes the method of example 50 (as well as subject matter of one or more of any combination of examples 50-78), wherein the microtexture cones of the replica have a period that ranges from about 5 microns to about 15 microns.

Example 80 includes the method of example 50 (as well as subject matter of one or more of any combination of examples 50-79), wherein the microtexture cones of the replica have a height of greater than 0 microns to about 50 microns.

Example 81 includes the method of example 50 (as well as subject matter of one or more of any combination of examples 50-80), wherein the microtexture cones of the replica have a height of about 10 microns to about 40 microns.

Example 82 includes the method of using the replica of example 50 (as well as subject matter of one or more of any combination of examples 50-81) to provide an element to control light reflection in an optoelectronic device.

Example 83 includes the method of using the replica of example 50 (as well as subject matter of one or more of any combination of examples 50-82) to provide an element to control light transmission in an optoelectronic device.

Example 84 includes the method of using the replica of example 50 (as well as subject matter of one or more of any combination of examples 50-83) to provide an element to control light absorption in an optoelectronic device.

Example 85 includes the method of using the replica of example 50 (as well as subject matter of one or more of any combination of examples 50-84) to provide an element to control light scattering in an optoelectronic device.

Example 86 includes the method of using the replica of example 50 (as well as subject matter of one or more of any combination of examples 50-85) to provide an element to control light reflection, transmission, absorption, and scattering in an optoelectronic device.

Example 87 includes the method of example 82 (as well as subject matter of one or more of any combination of examples 50-86), wherein the optoelectronic device comprises at least one of: photodetector, photovoltaic cell, photoconductive devices, sensor application, sensor, optical device, electronic device, or photonic device.

Example 88 includes the method of using the replica of example 50 (as well as subject matter of one or more of any combination of examples 50-87) to provide a protective layer in an optoelectronic device.

Example 89. The method of using the replica of example 50 (as well as subject matter of one or more of any combination of examples 50-88) to provide an element for controlled cell growth.

Example 90 includes the method of using the replica of example 50 (as well as subject matter of one or more of any combination of examples 50-89) to provide a superhyrdophobic element for preventing the formation or accumulation of ice.

Example 91 includes the method of using the replica of example 50 (as well as subject matter of one or more of any combination of examples 50-90) to provide an element to control light reflection in an optical device.

Example 92 includes the method of using the replica of example 50 (as well as subject matter of one or more of any combination of examples 50-91) to provide an element to control light transmission in an optical device.

Example 93 includes the method of using the replica of example 50 (as well as subject matter of one or more of any combination of examples 50-92) to provide an element to control light absorption in an optical device.

Example 94 includes the method of using the replica of example 50 (as well as subject matter of one or more of any combination of examples 50-93) to provide an element to control light scattering in an optical device.

Example 95 includes the method of using the replica of example 50 (as well as subject matter of one or more of any combination of examples 50-94) to provide an element to control light reflection, transmission, absorption, and scattering in an optical device.

Example 96 includes the method of using the replica of example 50 (as well as subject matter of one or more of any combination of examples 50-95) to provide a protective layer in an optical device.

Example 97 includes a method for replicating at least one master having at least one textured surface, wherein the at least one textured surface is textured with microtexture features The method comprising: providing at least one replicating material; placing the at least one replicating material in conforming contact with the at least one textured surface; heating the at least one replicating material for at least a portion of the time that the at least one replicating material is in contact with the at least one textured surface of the at least one master; and removing the at least one replicating material from the at least one textured surface to provide a replica of the microtextured surface of the at least one master, wherein the replica comprises a surface with microstructure features.

Example 98 includes the method of example 97 (as well as subject matter of one or more of any combination of examples 1-96), wherein the microtexture features of the at least one master include nanoscale features on their surfaces.

Example 99 includes the method of example 98 (as well as subject matter of one or more of any combination of examples 1-98), wherein the nanoscale features of the at least one master comprises a grating or wires.

Example 100 includes the method of example 97 (as well as subject matter of one or more of any combination of examples 1-99), wherein the microtexture features of the replica include nanoscale features on their surfaces.

Example 101 includes the method of example 97 (as well as subject matter of one or more of any combination of examples 1-100), wherein the replica is superhydrophobic.

Example 102 includes a method for replicating at least one master having at least one textured surface, wherein the at least one textured surface is textured with microtexture features. The method comprising the following steps: providing at least one substrate; providing at least one replicating material, wherein the at least one replicating material is in communication with the at least one substrate; placing the at least one textured surface of the at least one master in contact with the at least one replicating material; applying an embossing force to the combination of the at least one master, the at least one replicating material, and the at least one substrate; heating at least one of the at least one master, the at least one replicating material, and the at least one substrate; reducing or eliminating the heating; removing the embossing force; and separating the at least one master from the at least one replicating material to directly provide a replica of the microtextured surface of the at least one master, without any additional processing steps to accomplish the replica, and wherein the replica comprises a surface with microtexture features.

Example 103 includes the method of example 102 (as well as subject matter of one or more of any combination of examples 1-101), wherein the microtexture features of the at least one the master includes nanoscale features on its surface.

Example 104 includes the method of example 103 (as well as subject matter of one or more of any combination of examples 1-103), wherein the nanoscale features of the at least one master comprises a grating or wires.

Example 105 includes the method of example 102 (as well as subject matter of one or more of any combination of examples 1-104), wherein the microtexture features of the replica include nanoscale features on its surface.

Example 106 includes the method of example 102 (as well as subject matter of one or more of any combination of examples 1-105), wherein the replica is superhydrophobic.

Example 107 includes the replica of the microtextured surface of the at least one master produced by any one of the methods of examples 1, 46, 50, 97 and 102 (as well as subject matter of one or more of any combination of examples 1-106).

Example 108 wherein the replica of example 107 (as well as subject matter of one or more of any combination of examples 1-106), wherein the replica is superhydrophobic.

The devices, systems, compositions, apparatuses, elements, components, uses, applications, and methods of various embodiments of the invention disclosed herein may utilize aspects, devices, systems, compositions, apparatuses, elements, components, uses, applications, and methods disclosed in the following references, applications, publications and patents of which are hereby incorporated by reference herein in their entirety:

[1] S. J. Martin, K. O. Wessendorf, C. T. Gebert, G. C. Frye, R. W. Cernosek, L. Casaus, M. A. Mitchell, Measuring liquid properties with smooth- and textured-surface resonators, in: Frequency Control Symposium, 1993. 47th., Proceedings of the 1993 IEEE International, (1993) 603-608

[2] J. Zhao, A. Wang, P. Campbell, M. A. Green, 22.7% Efficient Silicon Photovoltaic Modules with Textured Front Surface, IEEE Trans Electron Devices, 46, 7, (1999)1495-1497.

[3] J. M. Gee, H. L. Tardy, T. D. Hund, R. Gordon, H. Liang, Reflectance control for multicrystalline-silicon photovoltaic modules using textured-dielectric coatings, Photovoltaic Energy Conversion, 1994., Conference Record of the Twenty Fourth. IEEE Photovoltaic Specialists Conference-1994, 1994 IEEE First World Conference on, vol. 2, (1994) 1274-1277

[4] A. Mata, Xiaowei Su, A. J. Fleischman, S. Roy, B. A. Banks, S. K. Miller, R. J. Midura, Osteoblast attachment to a textured surface in the absence of exogenous adhesion proteins, IEEE NanoBioscience, 2(4) (2003) 287-294

[5] P. Campbell, and M. A. Green, Light trapping properties of pyramidally textured, J Appl Phys 62 (1987) 243-249.

[6] J. M. Gee, W. K. Schubert, H. L. Tardy, T. D. Hund, G. Robison, The effect of encapsulation on the reflectance of photovoltaic modules using textured multicrystalline-silicon solar cells, in: Photovoltaic Energy Conversion, 1994., Conference Record of the Twenty Fourth. IEEE Photovoltaic Specialists Conference-1994, 1994 IEEE First World Conference on, vol 2, (1994)1555-1558.

[7] D. H. Macdonald, A. Cuevas, M. J. Kerr, C. Samundsett, D. Ruby, S. Winderbaum, A. Leo, Texturing industrial multicrystalline silicon solar cells, Solar Energy 76 (2004) 277-283.

[8] T. Matsui, M. Tsukiji, H. Saika, T. Toyama, H. Okamoto, Influence of substrate texture on microstructure and photovoltaic performances of thin film polycrystalline silicon solar cells, J Non Cryst Solids, Volumes 299-302, Part 2, (2002) 1152-1156.

[9] V. V. Iyengar, B. K. Nayak, M. C. Gupta, Optical properties of silicon light trapping structures for photovoltaics, Solar Energy Materials & Solar Cells 94, (2010) 2251-2257.

[10] J. Yoo, G. Yu, J. Yi, Black surface structures for crystalline silicon solar cells, Materials Science and Engineering: B, Volumes 159-160, in: EMRS 2008 Spring Conference Symposium K: Advanced Silicon Materials Research for Electronic and Photovoltaic Applications, (2009), pp. 333-337.

[11] Y. Xia, J. A. Rogers, K. E. Paul, G. M. Whitesides, Unconventional Methods for Fabricating and Patterning Nanostructures, Chem Rev 99 7, (1999) 1823-1848.

[12] P. N. Vinod, M. Lal, Surface and optical characterization of the porous silicon textured surface, J. Mater. Sci. Mater. Electron. 16, (2005) 1-6.

[13] P. Papet, O. Nichiporuk, A. Kaminski, Y. Rozier, J. Kraiem, J.-F. Lelievre, A. Chaumartin, A. Faye, M. Lemiti, Pyramidal texturing of silicon solar cell with TMAH chemical anisotropic etching, Solar Energy Materials and Solar Cells, Volume 90, Issue 15, Selected Papers from the Solar Cells and Solar Energy Materials Symposium-IMRC 2005, 22 (2006) 2319-2328.

[14] W. Sparber, O. Schultz, D. Birol, G. Emanuel, R. Preu, A. Poddey, D. Borchert, Comparison of texturing methods for monocrystalline silicon solar cells using KOH and Na2CO3. In: Proceedings of 3rd World Conference on Photovoltaic Energy Conversion, (2003), pp. 1372-1375.

[15] M. Tucci, R. De Rosa, F. Roca, CF4/02 dry etching of textured crystalline silicon surface in a-Si:H/c-Si heterojunction for photovoltaic applications, Solar Energy Materials and Solar Cells, 69, 2, (2001), 175-185.

[16] N. Yamada, O. N. Kim, T. Tokimitsu, Y. Nakai, H. Masuda, Optimization of anti-reflection moth-eye structures for use in crystalline silicon solar cells, Prog. Photovolt: Res. Appl. (2011) 19 pp. 134-140

[17] B. K. Nayak, M. C. Gupta, K. W. Kolasinski, Formation of nano-textured conical microstructures in titanium metal surface by femtosecond laser irradiation, Applied Physics A, 90, (2008) 399-402.

[18] B. K. Nayak, M. C. Gupta, K. W. Kolasinski, Ultrafast-laser-assisted chemical restructuring of silicon and germanium surfaces, Applied Surface Science, 253, 15, (2007) 6580-6583.

[19] B. K. Nayak, M. C. Gupta, Self-organized micro/nanostructures in metal surfaces by ultrafast laser irradiation, Optics and Lasers in Engineering 48, (2010) 940-949.

[20] W. Rasband. ImageJ User Guide: Plot Profile[online] Available from: URL: http://imagej.nih.gov/ij/docs/guide/userguide-27.html#toc-Subsection-27.11

[21] L. Martinu and D. Poitras, Plasma deposition of optical films and coatings: A review, J. Vac. Sci. Technol. A 18 (2000), 2619-2645.

[22] D. Redfield, Multiple-pass thin-film silicon solar cell, Appl. Phys. Lett. 25 11, (1974) 647-648.

[23] P. Caffrey, B. K. Nayak and M. C. Gupta, "Ultrafast laser induced micro/nano structures replication and optical properties" Applied Optics, vol. 51, 10 Feb. 2012, 604-609.

[24] B. K. Nayak, B. Eaton, J. A. Anna Selvan, J. McLeskey, M. C. Gupta, R. Romero and G. Ganguly, "Semiconductor laser crystallization of a-Si:H on conducting tin oxide coated glass for solar cell and display applications", Applied Physics A, 80 (5): 1077-1080 February 2005.

[25] B. K. Nayak, M. C. Gupta, Femtosecond-laser-induced-crystallization and simultaneous formation of light trapping microstructures in thin a-Si:H films, Applied Physics A: Materials Science and Processing, 89 (2007) 663-666.

[26] B. K. Nayak, V. V. Iyengar, M. C. Gupta, Efficient light trapping in silicon solar cells by ultrafast-laser-induced self-assembled micro/nano structures, Progress in Photovoltaics: Research and Applications, 19, 631-639 (2011).

[27] B. K. Nayak, M. C. Gupta, K. W. Kolasinski, Spontaneous formation of nanospiked microstructures in germanium by femtosecond laser irradiation, Nanotechnology, 18, 195302 (2007).

[28] V. V. Iyengar, B. K. Nayak, K. L. More, H. M. Meyer, J. V. Li, M. C. Gupta, Properties of ultrafast laser textured silicon for photovoltaics, Solar Energy Materials and Solar Cells, 95, 2745-2751 (2011).

[29] C. Y. Chien and M. C. Gupta, "Pulse width effect in ultrafast laser processing of materials", Applied Physics A: Materials Science & Processing, *Applied Physics A*, Vol. 81, 1257, (2005).

[30] Z. Li, B. K. Nayak, V. V. Iyengar, D. McIntosh, Q. Zhou, M. C. Gupta and J. C. Campbell, "Laser-textured silicon photodiode with broadband spectral response", Applied Optics, 50, 2508 (2011).

[31] V. V. Iyengar, B. K. Nayak and M. C. Gupta, "Ultralow reflectance metal surfaces by ultrafast laser texturing", Applied Optics, 49, 5983 (2010).

[32] M. C. Gupta, "A Study of Laser Marking of Thin Films", J. Mat. Res. 3, 1187 (1988). Editor-in-Chief for Handbook of Photonics, CRC Press (1997) and 2nd edition in 2007.

[33] V. V. Iyengar, B. K. Nayak and M. C. Gupta, "Laser Assisted Doping for Photovoltaic Applications", Journal of Laser Micro Nanoengineering, 4, 89-94, August 2009.

[34] B. Sopori, J. Madjdpour, Y. Zhang, and W. Chen, "Optical Modeling of a-Si Solar Cells," NREL/CP-520-25783, National Renewable Energy Laboratory, (1999).

[35] J. Y. Chen, W. L. Chang, C. K. Huang, and K. W. Sun, "Biomimetic nanostructured antireflection coating and its application on crystalline silicon solar cells", Opt. Express 19, 14411-14419 (2011).

[36] M. Nam, J. Lee, and K.-K. Lee, "Efficiency improvement of solar cells by importing microdome-shaped anti-reflective structures as a surface protection layer", Microelectron. Eng. 88, 2314-2318 (2011).

[37] J. Escarrye, K. Soderstrom, C. Battaglia, F.-J. Haug, and C. Ballif, "High fidelity transfer of nanometric random textures by UV embossing for thin film solar cells applications", Sol. Energy Mater. Sol. Cells 95, 881-886 (2011).

[38] T. Yao, P. Wu, T. Wu, C. Cheng, and S. Yang, "Fabrication of anti-reflective structures using hot embossing with a stainless steel template irradiated by femtosecond laser", Microelectron. Eng. 88, 2908-2912 (2011).

[39] U.S. patent application Ser. No. 12/530,313 entitled "Systems and Methods of Laser Texturing of Material Surfaces and their Applications," filed Feb. 23, 2010.

[40] International Patent Application No. PCT/US2008/056033 entitled "Systems and Methods of Laser Texturing of Material Surfaces and their Applications," filed Mar. 6, 2008.

[41] U.S. patent application Ser. No. 12/158,553 entitled "Systems and Methods of Laser Texturing and Crystallization of Material Surfaces," filed Jun. 20, 2008.

[42] International Patent Application No. PCT/US2006/049065 entitled "Systems and Methods of Laser Texturing and Crystallization of Material Surfaces," filed Dec. 21, 2006.

[43] U.S. patent application Ser. No. 12/098,000 entitled "Conducting Nanotubes or Nanostructures Based Composites, Method of Making Them and Applications," filed Jun. 18, 2008; U.S. Patent Application Publication No. 2010/0000770, Jan. 7, 2010.

[44] International Patent Application No. PCT/US2006/048165 entitled "Conducting Nanotubes or Nanostructures Based Composites, Method of Making Them and Applications," filed Dec. 19, 2006.

Unless clearly specified to the contrary, there is no requirement for any particular described or illustrated activity or element, any particular sequence or such activities, any particular size, speed, material, duration, contour, dimension or frequency, or any particularly interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. It should be appreciated that aspects of the present invention may have a variety of sizes, contours, shapes, compositions and materials as desired or required.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the following claims, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

We claim:

1. A method for replicating at least one textured surface, said method comprising the following steps:
    providing at least one master having at least one textured surface with microtexture cones, wherein said microtextured cones of said at least one master includes nanoscale features on surfaces of said microtexture cones of said at least one master;
    providing at least one substrate;
    providing at least one replicating material, wherein said at least one replicating material is in communication with said at least one substrate;
    placing said at least one textured surface of said at least one master in contact with said at least one replicating material;
    applying an embossing force to the combination of said at least one master, said at least one replicating material, and said at least one substrate;
    heating at least one of said at least one master, said at least one replicating material, and said at least one substrate;
    reducing or eliminating said heating;
    removing said embossing force;
    separating said at least one master from said at least one replicating material to provide a replica of said at least one textured surface with microtexture cones of said at least one master, wherein said microtexture cones of said replica includes nanoscale features on surfaces of said microtexture cones of said replica, wherein said nanoscale features of said replica are the result of correctly replicating said at least one master;
    wherein said separating step directly provides said replica without any additional processing steps to accomplish said replica, and wherein said surface of said replica is superhydrophobic.

2. The method of claim 1, wherein said superhydrophobic replica provides an anti-icing component.

3. The method of claim 1, wherein said superhydrophobic replica provides a self-cleaning component.

4. The method of claim 1, wherein said surface of said replica has decreased reflectivity after said removal.

5. A method for replicating at least one textured surface, said method comprising the following steps:
    providing at least one master having at least one textured surface with microtexture features, wherein said microtexture features of said at least one master include nanoscale features on surface of said microtexture feature of said at least one master;
    providing at least one substrate;
    providing at least one replicating material, wherein said at least one replicating material is in communication with said at least one substrate;
    placing said at least one textured surface of said at least one master in contact with said at least one replicating material;
    applying an embossing force to the combination of said at least one master, said at least one replicating material, and said at least one substrate;
    heating at least one of said at least one master, said at least one replicating material, and said at least one substrate;
    reducing or eliminating said heating;
    removing said embossing force;
    separating said at least one master from said at least one replicating material to provide a replica of said at least one textured surface with microtexture features of said at least one master, wherein said microtexture features of said replica include nanoscale features on surface of said microtexture features of said replica, wherein said nanoscale features of said replica are the result of the correctly replicating said at least one master;
    wherein said separating step directly provides said replica without any additional processing steps to accomplish said replica, and wherein said surface of said replica is superhydrophobic.

6. The method of claim 5, wherein said nanoscale features of said at least one master comprises a grating or wires.

* * * * *